United States Patent
Kinne et al.

(10) Patent No.: US 12,208,411 B2
(45) Date of Patent: Jan. 28, 2025

(54) HANDHELD FLUID SPRAYER

(71) Applicant: Graco Minnesota Inc., Minneapolis, MN (US)

(72) Inventors: Robert W. Kinne, Columbia Heights, MN (US); Diane L. Olson, Elk River, MN (US); Pamela J. Muetzel, Maple Lake, MN (US); Kirsten N. Norman, Oak Grove, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 482 days.

(21) Appl. No.: 17/613,727

(22) PCT Filed: May 29, 2020

(86) PCT No.: PCT/US2020/035135
§ 371 (c)(1),
(2) Date: Nov. 23, 2021

(87) PCT Pub. No.: WO2020/243438
PCT Pub. Date: Dec. 3, 2020

(65) Prior Publication Data
US 2022/0234062 A1    Jul. 28, 2022

Related U.S. Application Data

(60) Provisional application No. 62/874,106, filed on Jul. 15, 2019, provisional application No. 62/855,043, filed on May 31, 2019.

(51) Int. Cl.
*B05B 7/24* (2006.01)
*B01D 29/085* (2006.01)
(Continued)

(52) U.S. Cl.
CPC .......... *B05B 7/2408* (2013.01); *B01D 29/085* (2013.01); *B67C 11/02* (2013.01); *B05B 9/0861* (2013.01)

(58) Field of Classification Search
CPC .. B05B 11/0097; B05B 11/0056; B67C 11/02
(Continued)

(56) References Cited

U.S. PATENT DOCUMENTS 235,101 A    12/1880    Eyan
1,101,506 A    6/1914    Leslie
(Continued)

FOREIGN PATENT DOCUMENTS

CN    2225310 Y    4/1996
CN    1185525 A    6/1998
(Continued)

OTHER PUBLICATIONS

JP2003340324A (published Dec. 2, 2003) and translation (2024) thereof (Year: 2024).*

(Continued)

*Primary Examiner* — Timothy P. Kelly
(74) *Attorney, Agent, or Firm* — Kinney & Lange, P. A.

(57) ABSTRACT

A handheld fluid sprayer (10) is configured to draw spray fluid from a reservoir (14) mounted on the fluid sprayer and eject the spray fluid through a nozzle (32). The reservoir is removably mounted to the fluid sprayer. A filling apparatus can connect to the reservoir at the same interfaced that the reservoir (14) connects to the fluid sprayer (10). The filling apparatus can be used to refill the reservoir (14).

19 Claims, 17 Drawing Sheets

(51) Int. Cl.
*B67C 11/02* (2006.01)
*B05B 9/08* (2006.01)

(58) Field of Classification Search
USPC .......................... 141/18, 20, 20.5, 340, 344
See application file for complete search history.

(56) References Cited

U.S. PATENT DOCUMENTS

| | | |
|---|---|---|
| 1,174,905 A | 3/1916 | Seeger |
| 1,352,102 A | 9/1920 | Tatro |
| 1,422,371 A | 7/1922 | Page |
| 1,468,226 A | 9/1923 | Colburn et al. |
| 1,650,377 A | 11/1927 | Nixon |
| 1,911,603 A | 5/1933 | Breuer |
| 2,123,358 A | 7/1938 | Fritz |
| 2,182,063 A | 12/1939 | Steiner |
| 2,195,929 A | 4/1940 | Klett |
| 2,196,054 A | 4/1940 | Bullock |
| 2,339,741 A | 1/1944 | Cartwright |
| 2,394,487 A | 2/1946 | Rotter et al. |
| 2,405,006 A | 7/1946 | Ashton |
| 2,407,792 A | 9/1946 | Mcmillan |
| 2,488,789 A | 11/1949 | Williams |
| 2,491,230 A | 12/1949 | Theis |
| 2,524,820 A | 10/1950 | Miles |
| 2,540,357 A | 2/1951 | Stanley |
| 2,629,539 A | 2/1953 | Drewes, Jr. |
| 2,631,892 A | 3/1953 | Czarnecki, Jr. et al. |
| 2,637,194 A | 5/1953 | Pietri |
| 2,639,194 A | 5/1953 | Wahlin |
| 2,664,312 A | 12/1953 | Czarnecki, Jr. et, al. |
| 2,705,663 A | 4/1955 | Gilbreath |
| 2,736,606 A | 2/1956 | Kmiotek |
| 2,752,854 A | 7/1956 | Prior et al. |
| 2,775,094 A | 12/1956 | Buckland et al. |
| 2,791,451 A | 5/1957 | Rostan |
| 2,840,989 A | 7/1958 | Macaulay |
| 2,858,851 A | 11/1958 | Holl |
| 2,875,782 A | 3/1959 | Lee |
| 2,919,726 A | 1/1960 | Zimmermann et al. |
| 2,967,112 A | 1/1961 | Kay et al. |
| 2,994,344 A | 8/1961 | Kerley |
| 2,998,828 A | 9/1961 | Hare |
| 2,999,646 A | 9/1961 | Wagner |
| 3,009,606 A | 11/1961 | Zimmermann |
| 3,012,900 A | 12/1961 | Kleinmann et al. |
| 3,023,936 A | 3/1962 | Marsh et al. |
| 3,065,918 A | 11/1962 | Hostetter |
| 3,156,452 A | 11/1964 | Touzalin et al. |
| 3,207,080 A | 9/1965 | Schlosser |
| 3,250,225 A | 5/1966 | Taplin |
| 3,250,255 A | 5/1966 | Cruickshank |
| 3,276,389 A | 10/1966 | Bower, Jr. |
| 3,317,141 A | 5/1967 | Mann |
| 3,347,205 A | 10/1967 | Dobbyn |
| 3,363,806 A | 1/1968 | Blakeslee et al. |
| 3,401,842 A | 9/1968 | Morrison |
| 3,403,818 A | 10/1968 | Bruno |
| 3,408,876 A | 11/1968 | Andrews |
| 3,416,461 A | 12/1968 | Mcfarland |
| 3,432,104 A | 3/1969 | Kaltenbach |
| 3,433,415 A | 3/1969 | Eugen |
| 3,457,957 A | 7/1969 | Mueller |
| 3,462,082 A | 8/1969 | Everett |
| 3,507,686 A | 4/1970 | Hagenbach |
| 3,530,893 A | 9/1970 | Kenzi |
| 3,558,052 A | 1/1971 | Dunn |
| 3,630,484 A | 12/1971 | Taylor |
| 3,633,828 A | 1/1972 | Larson |
| 3,658,257 A | 4/1972 | Rood |
| 3,678,959 A | 7/1972 | Liposky |
| 3,680,981 A | 8/1972 | Wagner |
| 3,684,253 A | 8/1972 | Bevan |
| 3,708,118 A | 1/1973 | Keur |
| 3,741,689 A | 6/1973 | Rupp |
| 3,747,899 A | 7/1973 | Atinen et al. |
| 3,752,400 A | 8/1973 | Calder |
| 3,763,891 A | 10/1973 | Stiltner |
| 3,769,879 A | 11/1973 | Lofquist |
| 3,775,030 A | 11/1973 | Wanner |
| 3,789,954 A | 2/1974 | Raleigh |
| 3,805,833 A | 4/1974 | Teed |
| 3,856,273 A | 12/1974 | Born |
| 3,889,881 A | 6/1975 | Cunningham et al. |
| 3,893,627 A | 7/1975 | Siczek et al. |
| 3,894,816 A | 7/1975 | Davis et al. |
| 3,916,449 A | 11/1975 | Davis |
| 3,937,923 A | 2/1976 | Smith |
| 3,938,563 A | 2/1976 | Gall |
| 3,955,763 A | 5/1976 | Pyle et al. |
| 3,993,250 A | 11/1976 | Shure |
| 3,999,896 A | 12/1976 | Sebastiani |
| 4,008,984 A | 2/1977 | Scholle |
| 4,018,143 A | 4/1977 | Dice, Jr. et al. |
| 4,033,511 A | 7/1977 | Chamberlin |
| 4,068,982 A | 1/1978 | Quarve |
| 4,144,012 A | 3/1979 | Pinkley |
| 4,146,179 A | 3/1979 | Egli et al. |
| 4,151,929 A | 5/1979 | Sapien |
| 4,160,525 A | 7/1979 | Wagner |
| 4,162,037 A | 7/1979 | Koyama |
| 4,165,836 A | 8/1979 | Eull |
| 4,174,052 A | 11/1979 | Capra et al. |
| 4,178,246 A | 12/1979 | Klein |
| 4,224,958 A | 9/1980 | Kaplan et al. |
| 4,235,377 A | 11/1980 | Cooper et al. |
| 4,260,183 A | 4/1981 | Krupp |
| 4,264,282 A | 4/1981 | Crago |
| 4,265,372 A | 5/1981 | Wainberg |
| 4,294,408 A | 10/1981 | Snyder et al. |
| 4,301,971 A | 11/1981 | Cornelius et al. |
| 4,325,419 A | 4/1982 | Gubitose |
| 4,334,637 A | 6/1982 | Baker et al. |
| 4,365,745 A | 12/1982 | Beck |
| 4,386,739 A | 6/1983 | Kwok |
| 4,388,997 A | 6/1983 | Grime |
| 4,395,968 A | 8/1983 | Wahnschaff et al. |
| 4,403,924 A | 9/1983 | Gebauer et al. |
| 4,442,977 A | 4/1984 | Beiswenger et al. |
| 4,484,707 A | 11/1984 | Calder |
| 4,505,669 A | 3/1985 | Rogers |
| 4,545,504 A | 10/1985 | Fabel et al. |
| 4,549,467 A | 10/1985 | Wilden et al. |
| 4,582,254 A | 4/1986 | Rotolico et al. |
| 4,598,841 A | 7/1986 | Smiles |
| 4,613,078 A | 9/1986 | Marshall |
| 4,613,079 A | 9/1986 | Mains |
| 4,641,764 A | 2/1987 | Faulkner, III |
| 4,643,224 A | 2/1987 | Rung et al. |
| 4,655,398 A | 4/1987 | Liggett |
| 4,667,884 A | 5/1987 | Braziel |
| 4,735,362 A | 4/1988 | Trautwein et al. |
| 4,744,516 A | 5/1988 | Peterson et al. |
| 4,756,481 A | 7/1988 | Leuenberger |
| 4,771,920 A | 9/1988 | Boccagno et al. |
| 4,778,356 A | 10/1988 | Hicks |
| 4,790,455 A | 12/1988 | Dieringer et al. |
| 4,791,961 A | 12/1988 | Nitzberg et al. |
| 4,798,571 A | 1/1989 | Everman et al. |
| 4,800,801 A | 1/1989 | Van Zweeden |
| 4,820,052 A | 4/1989 | Krysel |
| 4,834,587 A | 5/1989 | Crawley et al. |
| 4,883,412 A | 11/1989 | Malizard et al. |
| 4,902,206 A | 2/1990 | Nakazawa et al. |
| 4,903,501 A | 2/1990 | Harl |
| 4,971,249 A | 11/1990 | Tam et al. |
| 5,044,555 A | 9/1991 | Youngeberg et al. |
| 5,051,067 A | 9/1991 | Terauchi |
| 5,052,432 A | 10/1991 | Vonalt et al. |
| 5,054,947 A | 10/1991 | Frank et al. |
| 5,066,199 A | 11/1991 | Reese et al. |
| 5,071,289 A | 12/1991 | Spivak |
| 5,092,750 A | 3/1992 | Leroy et al. |
| 5,100,058 A | 3/1992 | Wei |

(56) References Cited

U.S. PATENT DOCUMENTS

| | | |
|---|---|---|
| 5,106,274 A | 4/1992 | Holtzapple |
| 5,137,431 A | 8/1992 | Kiyoshi et al. |
| 5,145,339 A | 9/1992 | Lehrke et al. |
| 5,150,841 A | 9/1992 | Silvenis et al. |
| 5,160,041 A | 11/1992 | Taniguchi et al. |
| 5,161,450 A | 11/1992 | Ishikawa |
| 5,165,869 A | 11/1992 | Reynolds |
| 5,174,731 A | 12/1992 | Korver |
| 5,211,611 A | 5/1993 | Lammers et al. |
| 5,213,485 A | 5/1993 | Wilden |
| 5,219,274 A | 6/1993 | Pawlowski et al. |
| 5,220,521 A | 6/1993 | Kikinis |
| 5,249,932 A | 10/1993 | Van Bork |
| 5,269,670 A | 12/1993 | Allen et al. |
| 5,271,537 A | 12/1993 | Johnson |
| 5,273,075 A | 12/1993 | Skaer |
| 5,277,099 A | 1/1994 | Powers |
| 5,318,198 A | 6/1994 | Micek et al. |
| 5,330,106 A | 7/1994 | Braun |
| 5,340,029 A | 8/1994 | Adams |
| 5,362,212 A | 11/1994 | Bowen et al. |
| 5,366,353 A | 11/1994 | Hand |
| 5,366,639 A | 11/1994 | Jones et al. |
| 5,375,738 A | 12/1994 | Walsh et al. |
| 5,378,089 A | 1/1995 | Law |
| 5,378,122 A | 1/1995 | Duncan |
| 5,391,058 A | 2/1995 | Goto et al. |
| 5,399,014 A | 3/1995 | Takata et al. |
| 5,443,211 A | 8/1995 | Young et al. |
| 5,445,195 A | 8/1995 | Kim |
| 5,505,381 A | 4/1996 | Torntore |
| 5,509,431 A | 4/1996 | Smith, Jr. et al. |
| 5,527,160 A | 6/1996 | Kozumplik, Jr. et al. |
| 5,533,650 A | 7/1996 | Conrad et al. |
| 5,567,118 A | 10/1996 | Grgurich et al. |
| 5,575,941 A | 11/1996 | Johnson |
| 5,582,350 A | 12/1996 | Kosmyna et al. |
| 5,584,666 A | 12/1996 | Kozumplik, Jr. et al. |
| 5,598,974 A | 2/1997 | Lewis et al. |
| 5,616,005 A | 4/1997 | Whitehead |
| 5,624,690 A | 4/1997 | Boldis et al. |
| 5,649,809 A | 7/1997 | Stapelfeldt |
| 5,649,813 A | 7/1997 | Able et al. |
| 5,699,967 A | 12/1997 | Conatser et al. |
| 5,716,007 A | 2/1998 | Nottingham et al. |
| 5,728,219 A | 3/1998 | Allen et al. |
| 5,769,321 A | 6/1998 | Cyphers |
| 5,769,464 A | 6/1998 | Deblasi et al. |
| 5,791,830 A | 8/1998 | Fort et al. |
| 5,794,847 A | 8/1998 | Stocker |
| 5,816,501 A | 10/1998 | Lopresti et al. |
| 5,816,778 A | 10/1998 | Elsey, Jr. et al. |
| 5,820,022 A | 10/1998 | Fukano et al. |
| 5,826,795 A | 10/1998 | Holland et al. |
| 5,828,219 A | 10/1998 | Hanlon et al. |
| 5,839,612 A | 11/1998 | Burke |
| 5,873,528 A | 2/1999 | Lewis et al. |
| 5,875,922 A | 3/1999 | Chastine et al. |
| 5,924,850 A | 7/1999 | French |
| 5,927,954 A | 7/1999 | Kennedy et al. |
| 5,942,170 A | 8/1999 | Peitz |
| 5,967,429 A | 10/1999 | Ulfik et al. |
| 5,996,902 A | 12/1999 | Morimoto et al. |
| 6,009,606 A | 1/2000 | Voigtlaender et al. |
| 6,024,123 A | 2/2000 | Weissfloch et al. |
| 6,024,153 A | 2/2000 | Goldman |
| 6,024,481 A | 2/2000 | Hillstrom et al. |
| 6,032,690 A | 3/2000 | Weissfloch et al. |
| 6,056,213 A | 5/2000 | Ruta et al. |
| 6,089,471 A | 7/2000 | Scholl |
| 6,095,803 A | 8/2000 | Slater |
| 6,106,246 A | 8/2000 | Steck et al. |
| 6,142,749 A | 11/2000 | Jack et al. |
| 6,158,982 A | 12/2000 | Kennedy et al. |
| 6,168,049 B1 | 1/2001 | Bolyard |
| 6,168,093 B1 | 1/2001 | Greer et al. |
| 6,196,275 B1 | 3/2001 | Yazawa et al. |
| 6,210,141 B1 | 4/2001 | Allen |
| 6,260,583 B1 | 7/2001 | Flatt et al. |
| 6,264,115 B1 | 7/2001 | Liska et al. |
| 6,276,616 B1 | 8/2001 | Jenkins |
| 6,280,149 B1 | 8/2001 | Able et al. |
| 6,299,415 B1 | 10/2001 | Bahrton |
| 6,315,168 B1 | 11/2001 | Bolyard et al. |
| 6,319,996 B1 | 11/2001 | Burke et al. |
| 6,364,520 B1 | 4/2002 | Steele |
| 6,364,622 B1 | 4/2002 | Lishanski et al. |
| 6,378,782 B1 | 4/2002 | Craine et al. |
| 6,378,784 B1 | 4/2002 | Allen et al. |
| 6,390,386 B2 | 5/2002 | Krohn et al. |
| 6,402,486 B1 | 6/2002 | Steck et al. |
| 6,421,769 B1 | 7/2002 | Teitenberg et al. |
| 6,488,180 B1 | 12/2002 | Bayat |
| 6,595,441 B2 | 7/2003 | Petrie et al. |
| 6,599,107 B2 | 7/2003 | Cooper et al. |
| 6,619,569 B1 | 9/2003 | Jens |
| 6,631,855 B2 | 10/2003 | Huang |
| 6,644,564 B2 | 11/2003 | Perkitny |
| 6,644,941 B1 | 11/2003 | Able et al. |
| 6,666,258 B1 | 12/2003 | Kono |
| 6,702,198 B2 | 3/2004 | Tam et al. |
| 6,708,900 B1 | 3/2004 | Zhu et al. |
| D490,500 S | 5/2004 | Ye et al. |
| 6,739,363 B2 | 5/2004 | Walter et al. |
| 6,752,067 B1 | 6/2004 | Davidson et al. |
| 6,752,179 B1 | 6/2004 | Schwartz |
| 6,752,330 B2 | 6/2004 | Dimaggio et al. |
| 6,776,361 B1 | 8/2004 | Watanabe et al. |
| 6,796,514 B1 | 9/2004 | Schwartz |
| 6,811,095 B2 | 11/2004 | Donley et al. |
| 6,811,099 B2 | 11/2004 | Krestine et al. |
| 6,814,317 B2 | 11/2004 | Watanabe et al. |
| 6,817,544 B2 | 11/2004 | Hanson |
| 6,820,824 B1 * | 11/2004 | Joseph .................... B29C 51/08 239/377 |
| 6,883,960 B2 | 4/2005 | Reeder et al. |
| 6,933,634 B2 | 8/2005 | Frank et al. |
| 6,938,836 B2 | 9/2005 | Bouic |
| 6,942,126 B2 | 9/2005 | Douglas et al. |
| 6,953,155 B2 | 10/2005 | Joseph et al. |
| 6,962,487 B2 | 11/2005 | Caldwell |
| 6,971,590 B2 | 12/2005 | Blette et al. |
| 6,978,944 B1 | 12/2005 | Carey et al. |
| 7,017,628 B2 | 3/2006 | Najafi |
| 7,018,181 B2 | 3/2006 | Cooper et al. |
| 7,025,087 B2 | 4/2006 | Weinberger et al. |
| 7,032,839 B2 | 4/2006 | Blette et al. |
| 7,032,841 B1 | 4/2006 | Swisher |
| 7,070,653 B2 | 7/2006 | Frost et al. |
| 7,083,119 B2 | 8/2006 | Bouic et al. |
| 7,090,148 B2 | 8/2006 | Petrie et al. |
| 7,097,119 B2 | 8/2006 | Hornsby et al. |
| 7,123,500 B2 | 10/2006 | Ye et al. |
| RE39,399 E | 11/2006 | Allen |
| 7,143,960 B2 | 12/2006 | Joseph et al. |
| 7,172,139 B2 | 2/2007 | Bouic et al. |
| 7,172,337 B2 | 2/2007 | Roszczenko et al. |
| 7,175,110 B2 | 2/2007 | Vicentini |
| 7,182,229 B2 | 2/2007 | Gould et al. |
| 7,182,280 B2 | 2/2007 | Ye et al. |
| 7,188,785 B2 | 3/2007 | Joseph et al. |
| 7,201,336 B2 | 4/2007 | Blette et al. |
| 7,207,500 B2 | 4/2007 | Hudson et al. |
| 7,219,848 B2 | 5/2007 | Sweeton |
| 7,244,464 B2 | 7/2007 | Robens et al. |
| 7,255,294 B2 | 8/2007 | Sweeton et al. |
| 7,263,893 B2 | 9/2007 | Kosmyna et al. |
| 7,270,249 B1 | 9/2007 | Burkhead |
| 7,288,601 B2 | 10/2007 | Nogi et al. |
| 7,296,919 B2 | 11/2007 | Petersen et al. |
| 7,350,723 B2 | 4/2008 | Reedy |
| 7,354,255 B1 | 4/2008 | Ishanski et al. |
| 7,377,452 B2 | 5/2008 | Jones et al. |
| 7,399,168 B1 | 7/2008 | Eberwein |

(56) References Cited

U.S. PATENT DOCUMENTS

| | | |
|---|---|---|
| 7,410,106 B2 | 8/2008 | Escoto, Jr. et al. |
| 7,416,140 B2 | 8/2008 | Camilleri et al. |
| 7,431,494 B2 | 10/2008 | Zambaux |
| 7,478,979 B2 | 1/2009 | Zhou et al. |
| 7,513,443 B2 | 4/2009 | Escoto, Jr. et al. |
| 7,517,199 B2 | 4/2009 | Reed et al. |
| 7,575,633 B2 | 8/2009 | Romanin |
| 7,600,985 B2 | 10/2009 | Meloche et al. |
| 7,614,529 B2 | 11/2009 | Bolyard, Jr. et al. |
| 7,626,143 B2 | 12/2009 | Miller |
| 7,654,801 B2 | 2/2010 | Spude |
| 7,658,598 B2 | 2/2010 | Reed et al. |
| 7,699,243 B2 | 4/2010 | Starke |
| 7,708,084 B2 | 5/2010 | Duesselberg et al. |
| 7,712,682 B2 | 5/2010 | Joseph et al. |
| 7,713,519 B2 | 5/2010 | Bonda et al. |
| 7,721,774 B2 | 5/2010 | Cook et al. |
| 7,731,105 B2 | 6/2010 | Lishanski et al. |
| 7,758,321 B2 | 7/2010 | Fukano et al. |
| 7,766,250 B2 | 8/2010 | Kosmyna et al. |
| 7,770,760 B2 | 8/2010 | Mcguffey et al. |
| 7,789,324 B2 | 9/2010 | Bouic et al. |
| 7,798,425 B2 | 9/2010 | Joseph et al. |
| 7,798,426 B2 | 9/2010 | Joseph et al. |
| 7,798,427 B2 | 9/2010 | Joseph et al. |
| 7,819,253 B2 | 10/2010 | Borger et al. |
| 7,832,567 B2 | 11/2010 | Joseph |
| 7,857,173 B2 | 12/2010 | Bolyard, Jr. |
| D630,708 S | 1/2011 | Blenkush et al. |
| 7,870,891 B2 | 1/2011 | Rule |
| D633,176 S | 2/2011 | Blenkush et al. |
| 7,886,935 B2 | 2/2011 | Lasko |
| 7,905,358 B2 | 3/2011 | Backes et al. |
| 7,971,806 B2 | 7/2011 | Johnson et al. |
| 8,005,417 B2 | 8/2011 | Hattori et al. |
| 8,069,653 B2 | 12/2011 | Ganzer |
| 8,079,158 B2 | 12/2011 | Ekart et al. |
| 8,118,070 B2 | 2/2012 | Smith |
| 8,123,500 B2 | 2/2012 | Uterbock et al. |
| 8,152,362 B2 | 4/2012 | Uhlenkamp et al. |
| 8,167,586 B2 | 5/2012 | Towne |
| 8,182,247 B2 | 5/2012 | Gallwey et al. |
| 8,225,963 B2 | 7/2012 | Mehaffy et al. |
| 8,292,600 B2 | 10/2012 | Reed et al. |
| 8,313,313 B2 | 11/2012 | Uterbock et al. |
| 8,382,445 B2 | 2/2013 | Roseberry |
| 8,393,881 B2 | 3/2013 | Usui et al. |
| 8,485,792 B2 | 7/2013 | Mccourt et al. |
| 8,567,456 B1 | 10/2013 | Francis |
| 8,585,372 B2 | 11/2013 | Bacher et al. |
| 8,720,798 B2 | 5/2014 | Lynn |
| 9,174,231 B2 * | 11/2015 | Shultz .................. B05B 9/043 |
| 9,192,952 B2 | 11/2015 | Becker et al. |
| 9,796,492 B2 | 10/2017 | Luczak |
| 9,914,141 B2 | 3/2018 | Thompson et al. |
| 10,315,787 B2 | 6/2019 | Luczak |
| 11,446,690 B2 | 9/2022 | Thompson et al. |
| 2001/0035515 A1 | 11/2001 | Kennedy et al. |
| 2001/0038041 A1 | 11/2001 | Leer et al. |
| 2001/0048882 A1 | 12/2001 | Layman |
| 2002/0028103 A1 | 3/2002 | Frank et al. |
| 2003/0006311 A1 | 1/2003 | Rothrum et al. |
| 2003/0021181 A1 | 1/2003 | Maguire |
| 2003/0173420 A1 | 9/2003 | Hanson |
| 2003/0183655 A1 | 10/2003 | Padar |
| 2004/0057853 A1 | 3/2004 | Ross et al. |
| 2004/0069791 A1 | 4/2004 | Neal |
| 2004/0155118 A1 | 8/2004 | Rice |
| 2004/0217205 A1 | 11/2004 | Kohs et al. |
| 2004/0226969 A1 | 11/2004 | Shew |
| 2004/0251269 A1 | 12/2004 | Gosis et al. |
| 2004/0251321 A1 | 12/2004 | Ye et al. |
| 2004/0256490 A1 | 12/2004 | Sweeton |
| 2005/0016448 A1 | 1/2005 | Dilou |
| 2005/0046448 A1 | 3/2005 | Ha et al. |
| 2005/0085620 A1 | 4/2005 | Bruckmann |
| 2005/0095359 A1 | 5/2005 | Pallante et al. |
| 2005/0189445 A1 | 9/2005 | Hartle et al. |
| 2005/0238514 A1 | 10/2005 | Hagin |
| 2005/0263210 A1 | 12/2005 | Najafi |
| 2006/0040044 A1 | 2/2006 | Robens et al. |
| 2006/0060670 A1 | 3/2006 | Hartley |
| 2006/0076434 A1 | 4/2006 | Hornsby et al. |
| 2006/0086824 A1 | 4/2006 | Pearce et al. |
| 2006/0108981 A1 | 5/2006 | Walter et al. |
| 2006/0153707 A1 | 7/2006 | Sweeton et al. |
| 2006/0175433 A1 | 8/2006 | Escoto et al. |
| 2006/0208005 A1 | 9/2006 | Sweeton |
| 2006/0255072 A1 | 11/2006 | Hagin et al. |
| 2006/0257271 A1 | 11/2006 | Juterbock et al. |
| 2007/0025863 A1 | 2/2007 | Liedtke et al. |
| 2007/0080157 A1 | 4/2007 | Mehaffy et al. |
| 2007/0092385 A1 | 4/2007 | Petrie Pe |
| 2007/0125878 A1 | 6/2007 | Hahn et al. |
| 2007/0129469 A1 | 6/2007 | Befurt et al. |
| 2007/0131109 A1 | 6/2007 | Bruggeman et al. |
| 2007/0134050 A1 | 6/2007 | Bruggeman et al. |
| 2007/0137938 A1 | 6/2007 | Carpenter et al. |
| 2007/0138320 A1 | 6/2007 | Timmes et al. |
| 2007/0170285 A1 | 7/2007 | Schouten |
| 2007/0173705 A1 | 7/2007 | Teller et al. |
| 2007/0212241 A1 | 9/2007 | Lishanski et al. |
| 2007/0224358 A1 | 9/2007 | Insausti-Eciolaza et al. |
| 2007/0228186 A1 | 10/2007 | Hornsby et al. |
| 2007/0252019 A1 | 11/2007 | Peterson et al. |
| 2007/0261913 A1 | 11/2007 | Rossner et al. |
| 2007/0272707 A1 | 11/2007 | Peralta et al. |
| 2007/0278326 A1 | 12/2007 | Wu |
| 2007/0278787 A1 | 12/2007 | Jones et al. |
| 2008/0053566 A1 | 3/2008 | England |
| 2008/0065001 A1 | 3/2008 | Dinucci et al. |
| 2008/0093479 A1 | 4/2008 | Delbridge et al. |
| 2008/0104780 A1 | 5/2008 | Dayton et al. |
| 2008/0173705 A1 | 7/2008 | Girard et al. |
| 2008/0217360 A1 | 9/2008 | Maclean et al. |
| 2009/0000606 A1 | 1/2009 | Cooper et al. |
| 2009/0068036 A1 | 3/2009 | Hsu et al. |
| 2009/0095730 A1 | 4/2009 | Ganzer et al. |
| 2009/0110813 A1 | 4/2009 | Zimmerman et al. |
| 2009/0145980 A1 | 6/2009 | Jones |
| 2009/0152382 A1 | 6/2009 | Charpie |
| 2009/0266844 A1 | 10/2009 | Mcguffey |
| 2009/0272819 A1 * | 11/2009 | Charpie .................. B05B 7/2481 383/33 |
| 2009/0285983 A1 | 11/2009 | Baldauf et al. |
| 2009/0288403 A1 | 11/2009 | Behrens et al. |
| 2010/0045096 A1 | 2/2010 | Schonlau et al. |
| 2010/0048882 A1 | 2/2010 | Blagg et al. |
| 2010/0072300 A1 | 3/2010 | Miller et al. |
| 2010/0089012 A1 | 4/2010 | Duckworth et al. |
| 2010/0196176 A1 | 8/2010 | Kaufmann et al. |
| 2010/0255526 A1 | 10/2010 | Braet et al. |
| 2010/0288772 A1 | 11/2010 | Wambeke et al. |
| 2011/0079663 A1 | 4/2011 | Cabrera |
| 2011/0192866 A1 | 8/2011 | Shaw |
| 2011/0198413 A1 | 8/2011 | Thompson et al. |
| 2011/0206469 A1 | 8/2011 | Furuyama et al. |
| 2011/0240763 A1 | 10/2011 | Svendsen et al. |
| 2012/0037726 A1 | 2/2012 | Johnson et al. |
| 2012/0045352 A1 | 2/2012 | Lawyer et al. |
| 2012/0060511 A1 | 3/2012 | Zuo et al. |
| 2012/0063925 A1 | 3/2012 | Parker |
| 2012/0107059 A1 | 5/2012 | Howland et al. |
| 2012/0227389 A1 | 9/2012 | Hinderks |
| 2012/0267006 A1 * | 10/2012 | Liao ..................... B67C 11/02 141/331 |
| 2012/0298771 A1 | 11/2012 | Johnson et al. |
| 2013/0101445 A1 | 4/2013 | Schtze |
| 2013/0105598 A1 | 5/2013 | Shultz et al. |
| 2013/0192718 A1 | 8/2013 | Van Diepen et al. |
| 2013/0221130 A1 | 8/2013 | Joseph et al. |
| 2013/0243630 A1 | 9/2013 | Simmons et al. |
| 2015/0060568 A1 | 3/2015 | Johnson et al. |
| 2015/0226205 A1 | 8/2015 | Hines et al. |

(56) References Cited

U.S. PATENT DOCUMENTS

| | | | |
|---|---|---|---|
| 2015/0226206 | A1 | 8/2015 | Hines et al. |
| 2015/0314310 | A1 | 11/2015 | Bier |
| 2016/0332178 | A1 | 11/2016 | Becker et al. |
| 2016/0339462 | A1 | 11/2016 | Becker et al. |
| 2018/0071761 | A1 | 3/2018 | Luczak |
| 2018/0200743 | A1 | 7/2018 | Dawson et al. |
| 2024/0075486 | A1* | 3/2024 | Angelozzi ........... B05B 11/0097 |

FOREIGN PATENT DOCUMENTS

| | | | |
|---|---|---|---|
| CN | 1267241 | A | 9/2000 |
| CN | 1461382 | A | 12/2003 |
| CN | 1646811 | A | 7/2005 |
| CN | 1974282 | A | 6/2007 |
| CN | 2912820 | Y | 6/2007 |
| CN | 101022891 | A | 8/2007 |
| CN | 101049587 | A | 10/2007 |
| CN | 101111438 | A | 1/2008 |
| CN | 200998701 | Y | 1/2008 |
| CN | 201101999 | Y | 8/2008 |
| CN | 101273198 | A | 9/2008 |
| CN | 101678378 | A | 3/2010 |
| CN | 102066710 | A | 5/2011 |
| CN | 102202802 | A | 9/2011 |
| CN | 103736180 | A | 4/2014 |
| CN | 103752444 | A | 4/2014 |
| CN | 106687218 | A | 5/2017 |
| CN | 207259133 | U | 4/2018 |
| DE | 2433841 | A1 | 2/1976 |
| DE | 3432253 | A1 | 3/1986 |
| DE | 8713954 | U1 | 12/1987 |
| DE | 19612524 | A1 | 10/1997 |
| DE | 10315483 | A1 | 11/2004 |
| EP | 0312862 | A2 | 4/1989 |
| EP | 0678334 | A2 | 10/1995 |
| EP | 0714709 | A1 | 6/1996 |
| EP | 0718234 | A2 | 6/1996 |
| EP | 2302254 | A | 1/1997 |
| EP | 0781922 | A1 | 7/1997 |
| EP | 0847809 | A1 | 6/1998 |
| EP | 0993873 | A2 | 4/2000 |
| EP | 1479448 | A2 | 11/2004 |
| EP | 1627689 | A1 | 2/2006 |
| EP | 1772196 | A1 | 4/2007 |
| EP | 2168686 | A2 | 3/2010 |
| FR | 2307983 | A1 | 11/1976 |
| GB | 1576075 | A | 10/1980 |
| GR | 1005628 | B | 9/2007 |
| JP | 5138325 | | 3/1976 |
| JP | 51038325 | U | 3/1976 |
| JP | 51038325 | Y2 | 9/1976 |
| JP | 51038325 | B | 10/1976 |
| JP | 57131866 | U | 8/1982 |
| JP | S57200678 | A | 12/1982 |
| JP | 60178668 | A | 9/1985 |
| JP | S60178368 | U | 11/1985 |
| JP | 61083474 | U | 6/1986 |
| JP | S61255280 | A | 11/1986 |
| JP | 62114637 | A | 7/1987 |
| JP | S6259989 | B2 | 12/1987 |
| JP | S63100439 | A | 5/1988 |
| JP | S63100963 | A | 5/1988 |
| JP | 64021769 | U | 2/1989 |
| JP | H01148356 | A | 6/1989 |
| JP | H02500459 | A | 2/1990 |
| JP | H02196173 | A | 8/1990 |
| JP | H04500063 | A | 1/1992 |
| JP | 4346862 | A | 12/1992 |
| JP | 7194997 | A | 8/1995 |
| JP | H07289968 | A | 11/1995 |
| JP | H0889872 | A | 4/1996 |
| JP | H10290942 | A | 11/1998 |
| JP | 11048356 | A | 2/1999 |
| JP | 2001506720 | A | 5/2001 |
| JP | 2003340324 | A | 12/2003 |
| JP | 2004261720 | A | 9/2004 |
| JP | 3110693 | B2 | 5/2005 |
| JP | 2005324089 | A | 11/2005 |
| JP | 2007000837 | A | 1/2007 |
| JP | 2007222787 | A | 9/2007 |
| JP | 2007330750 | A | 12/2007 |
| JP | 2008006361 | A | 1/2008 |
| JP | 2008246404 | A | 10/2008 |
| JP | 4346862 | B2 | 7/2009 |
| JP | 2012506316 | | 3/2012 |
| JP | 5138325 | B2 | 11/2012 |
| JP | 2014132047 | A | 7/2014 |
| JP | 2014208349 | A | 11/2014 |
| JP | 6058282 | B2 | 12/2016 |
| KR | 1019970700134 | A | 1/1997 |
| KR | 20110089287 | A | 8/2011 |
| KR | 1020140031193 | A | 3/2014 |
| KR | 20150145021 | A | 12/2015 |
| TW | 454575 | U | 9/2001 |
| TW | M363944 | U | 9/2009 |
| WO | 5100220 | A1 | 2/1981 |
| WO | 8907499 | A1 | 8/1989 |
| WO | 9729850 | A1 | 8/1997 |
| WO | 0115836 | A1 | 3/2001 |
| WO | 2004037431 | A1 | 5/2004 |
| WO | 2007079932 | A1 | 7/2007 |
| WO | 2007149760 | A2 | 12/2007 |
| WO | 2010047800 | A2 | 4/2010 |
| WO | 2011094246 | A1 | 8/2011 |
| WO | 2013063231 | A1 | 5/2013 |
| WO | 2014089697 | A1 | 6/2014 |
| WO | 2016061643 | A1 | 4/2016 |

OTHER PUBLICATIONS

Second Communication Pursuant to Article 94(3) EPC for EP Application No. 20746363.9, Dated Jul. 5, 2023, pp. 4.
International Search Report and Written Opinion for PCT Application No. PCT/US2020/035135, Dated Nov. 11, 2020, p. 13.
First Communication Pursuant to Article 94(3) EPC for EP Application No. 20746363.9, Dated Feb. 3, 2023, pp. 4.
Second Chinese Office Action for CN Application No. 202080038947.5, Dated Jan. 20, 2023, pp. 13.
First Chinese Office Action for CN Application No. 202080038947.5, Dated Aug. 2, 2022, pp. 11.
International Preliminary Report on Patentability for PCT Application No. PCT/US2020/035135, Dated Dec. 9, 2021, pp. 9.
Third Communication Pursuant to Article 94(3) EPC for EP Application No. 20746363.9, Dated Mar. 5, 2024, pp. 5.
First Taiwan Office Action for TW Application No. 109118122, Dated Jan. 22, 2024, p. 7.

* cited by examiner

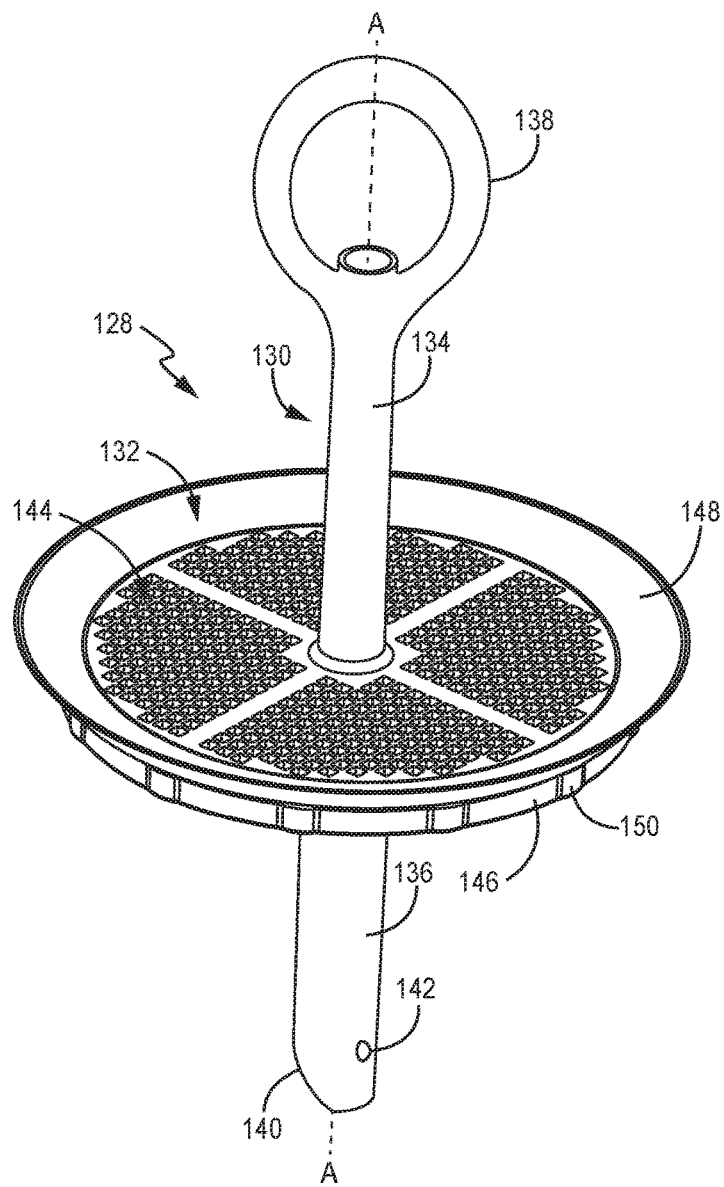
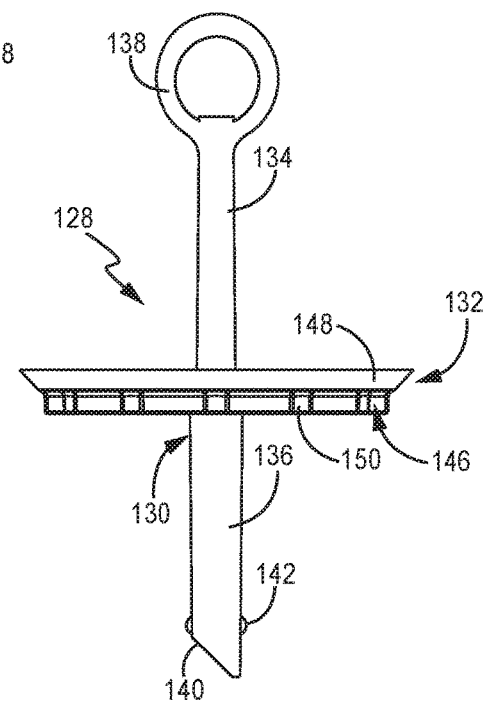
FIG. 6A
FIG. 6B

HANDHELD FLUID SPRAYER

CROSS-REFERENCE TO RELATED APPLICATION(S)

This application claims the benefit of U.S. Provisional Application No. 62/855,043 filed May 31, 2019, and entitled "HANDHELD PAINT SPRAYER FEATURES," and claims the benefit of U.S. Provisional Application No. 62/874,106 filed Jul. 15, 2019, and entitled "HANDHELD PAINT SPRAYER PRIMING," the disclosures of which are hereby incorporated by reference in their entirety.

BACKGROUND

This disclosure relates generally to fluid sprayers. More particularly, this disclosure relates to handheld fluid sprayers.

Handheld sprayers can be used to spray fluids on surfaces. For example, handheld sprayers can be used to spray paint, lacquer, finishes, and other coatings on walls, ceilings, and other structures. Airless paint sprayers provide the highest-quality finish due to the ability to finely atomize liquid paint. To ensure a high-quality finish from an airless paint sprayer, air is prevented from entering the pumping mechanism of the paint sprayer. Typically, the fluid supply is included in a rigid container and a suction hose is provided within the container. Air then replaces the volume of liquid sprayed throughout the spraying process. The suction hose generally extends to the bottom of the container from the pumping mechanism to allow a much fluid as possible to be sprayed before air begins to enter the suction hose. In some examples, a flexible liner is used and the air is vented through an opening in the container before spraying and during priming of the pump.

The fluid supply can be supported by the handheld sprayer. The fluid supply has a limited volume and must be refilled to continue spray operations. Refilling can include removing the reservoir and disassembling the reservoir to refill the reservoir with spray fluid.

SUMMARY

According to one aspect of the disclosure, a spray system includes a handheld sprayer having a body and a pump configured to pump spray fluid to a spray tip; a reservoir mountable to the handheld sprayer by a first interface formed between a reservoir mount and a sprayer mount; and a filling device mountable to the reservoir by a second interface formed between the reservoir mount and a fill mount. The filling device includes a funnel having the fill mount and configured to route fluid to the reservoir.

According to an additional or alternative aspect of the resent disclosure, a filling device us configured to route spray fluid to a reservoir removably mountable to a handheld sprayer. The filling device includes a funnel configured to lock to and unlock from the reservoir and a filter assembly mountable within the funnel. The funnel includes a funnel body extending between a top opening and a neck and a connector formed on the neck and configured to secure the funnel to the reservoir. The filter assembly includes a filter disk configured to engage an inner wall of the funnel body such that fluid through the funnel is routed through the filter disk.

According to another additional or alternative aspect of the disclosure, a method of filling a reservoir for a handheld fluid sprayer includes connecting a filling device to a reservoir by a first interface between a fill mount formed on a funnel of the filling device and a reservoir mount formed on the reservoir; pouring spray fluid into the funnel, the funnel directing the spray fluid to the reservoir through the first interface; disconnecting the filling device from the reservoir; and connecting the reservoir to the handheld fluid sprayer by a second interface between the reservoir mount and a sprayer mount of the handheld fluid sprayer.

According to another additional or alternative aspect of the disclosure, a handheld fluid sprayer includes a fluid supply; a nozzle configured to generate a fluid spray; a pump configured to drive fluid from the fluid supply to the nozzle; a pump supply channel extending from the fluid supply to a pumping chamber of the pump; a secondary channel extending from the fluid supply beyond the pumping chamber; and a priming valve associated with the secondary channel and actuatable between an open state and a closed state.

According to another additional or alternative aspect of the disclosure, a handheld sprayer includes a fluid supply supported by a sprayer body; a priming valve in fluid communication with the fluid supply and supported by the sprayer body; and a pump supported by a sprayer body and configured to pump spray fluid from the fluid supply to generate a fluid spray. A first pathway is disposed between the fluid supply and the pump and a second pathway longer than the first pathway is disposed between the fluid supply and the priming valve.

According to another additional or alternative aspect of the disclosure, a method of priming a handheld fluid sprayer includes forcing fluid from a fluid supply up a pump supply channel configured to provide spray fluid to a pump; and forcing fluid from the fluid supply through a secondary channel to a location disposed on an opposite side of a reciprocation axis of the pump from the fluid supply.

According to another additional or alternative aspect of the disclosure, a spray tip for a handheld fluid sprayer incudes a tip body having a tip channel extending laterally therethrough from an upstream end to a downstream end; a pre-orifice piece disposed within the tip channel; and a tip piece disposed within the tip channel adjacent the pre-orifice piece. The pre-orifice piece has a first upstream end, a first downstream end, and a receiving area. The tip piece has a second upstream end and a second downstream end. The second upstream end is disposed within the receiving area.

BRIEF DESCRIPTION OF THE DRAWINGS

FIG. 6A is an isometric view of a fill filter.
FIG. 6B is a side elevation view of the fill filter.

DETAILED DESCRIPTION

Figure 1:
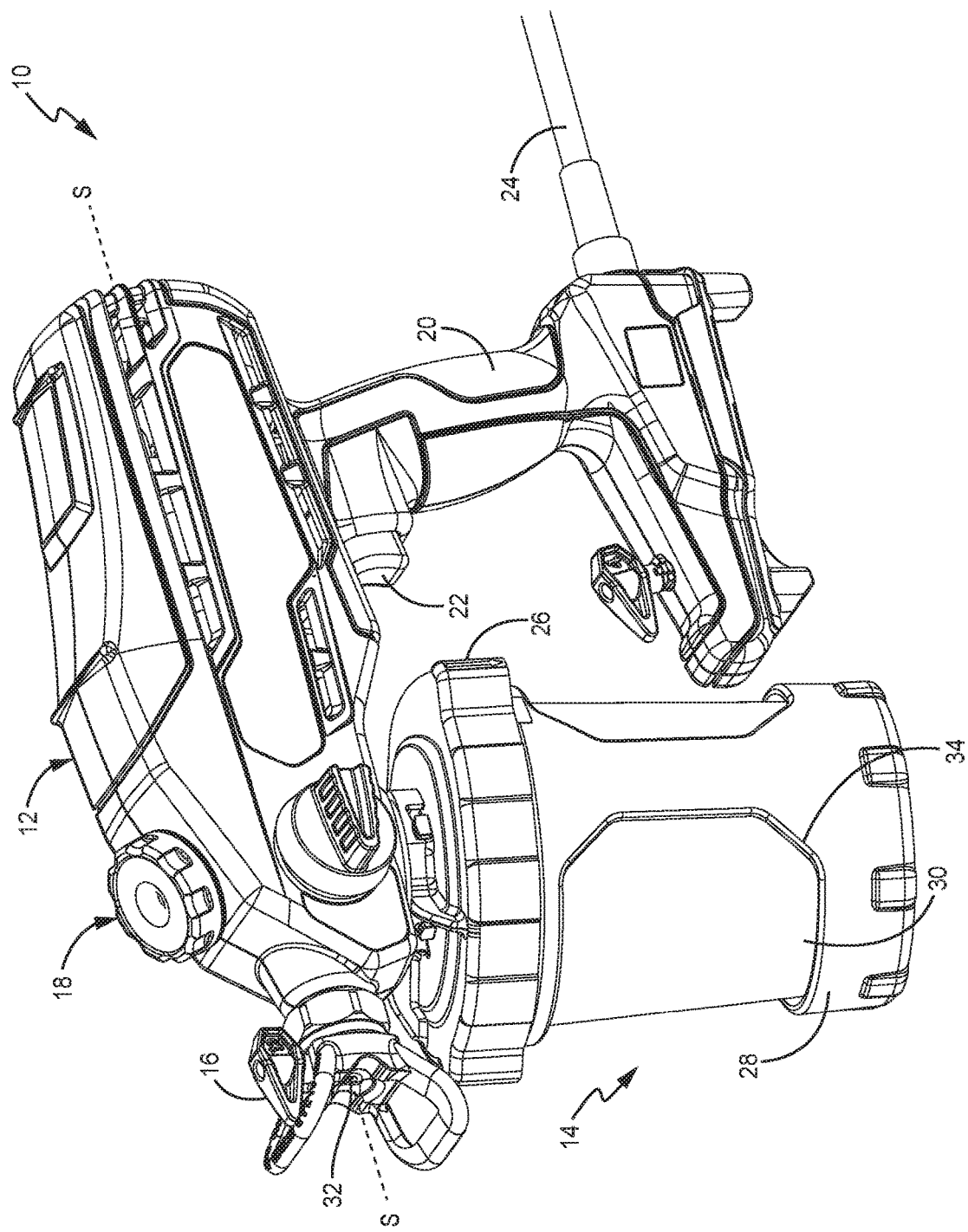
FIG. 1 is an isometric view of a handheld fluid sprayer.

FIG. 1 is an isometric view of sprayer 10. Sprayer 10 includes housing 12, reservoir 14, spray tip 16, priming valve 18, handle 20, trigger 22, and power source 24. Reservoir 14 includes lid 26, cup 28, and liner 30. Spray tip 16 includes nozzle 32. Sprayer 10 is a handheld sprayer configured to generate sprays of fluid that can be applied to a substrate. For example, sprayer 10 can be used for applying paint and other coatings. Paint will generally be used herein as an example, but it is understood that sprayer 10 can apply other coatings such as stains, lacquer, waterproofing, sealants, and adhesives, among other fluid options.

Housing 12 contains components for causing spraying of spray fluid by sprayer 10. A pump is disposed in housing 12 to pump spray fluid from reservoir 14 to nozzle 32. Housing 12 can be formed of any suitable material for supporting other components of sprayer 10. For example, housing 12 can be formed from a polymer or metal. In the example shown, housing 12 is a clamshell housing formed from two halves with a seam along a lateral center of housing 12. Handle 20 projects from a lower side of housing 12. A user can hold, support the full weight of, and operate sprayer 10 by grasping handle 20. Trigger 22 extends from a front side of handle 20. Actuating trigger 22 operates sprayer 10 to cause spraying by sprayer 10 and to stop spraying by sprayer 10. For example, the user can depress trigger 22 to activate spraying (e.g., by a switch of the trigger 22 powering a motor of the sprayer 10) and release trigger 22 to stop spraying. Power source 24 provides power to sprayer 10 to cause spraying by sprayer 10. In the example shown, power source 24 is a power cord that can be plugged into a suitable outlet, such as a wall socket. Additionally or alternatively, sprayer 10 can include a battery mounted to sprayer 10 for providing electric power to sprayer 10. Power source 24 can power a motor disposed within housing 12 to cause pumping by the pump.

Reservoir 14 is configured to store a supply of spray fluid for spraying. Lid 26 is attached to cup 28 and mounted to sprayer 10. Liner 30 is disposed within cup 28 and configured to hold the spray fluid. A lip of the liner 30 can be captured between cup 28 and lid 26 to form a fluid tight seal. Liner 30 can be accessed through windows 34 formed in cup 28 to squeeze liner 30 and evacuate air from reservoir 14 during priming, as discussed in more detail below. Reservoir 14 is mounted to and supported by housing 12 at interface 36. Interface 36 facilitates both mounting of reservoir 14 to the other components of sprayer 10 and refilling of reservoir 14.

In the example shown, reservoir 14 and handle 20 each project from the same side of housing 12 (e.g., both handle 20 and reservoir 14 are disposed below a spray axis S-S through nozzle 32). It is understood that, in some examples, handle 20 and reservoir 14 can be disposed on different sides of housing 12. In some examples, handle 20 and reservoir 14 can be disposed on opposite sides of housing 12 (e.g., one of handle 20 and reservoir 14 can extend from a top side of housing 12 and the other can extend from a bottom side of housing 12). Handle 20 and reservoir 14 can be disposed on opposite sides of a horizontal plane through the spray axis S-S.

Spray tip 16 is mounted to sprayer 10 and is configured to generate the spray. Spray tip 16 is removable and can be replaced. Spray tip 16 can be rotated between a spray position and a de-clog position. The spray tip 16 is positioned to generate and eject an atomized fluid spray through nozzle 32 when in the spray position. Spray tip 16 is reversed to eject any clogs or clumped fluid from spray tip 16 when in the de-clog position. Spray tip 16 can be configured to generate any desired spray pattern when in the spray position, such as a fan, among other options.

Priming valve 18 is disposed on handheld sprayer 10. In the example shown, priming valve 18 is disposed on an opposite side of housing 12 from reservoir 14. Priming valve 18 is shown as disposed on a top side of housing 12 while reservoir 14 extends from a bottom side of housing 12. Priming valve 18 facilitates priming of the pump of sprayer 10 by evacuating air from reservoir 14 prior to spraying.

Figure 2A:
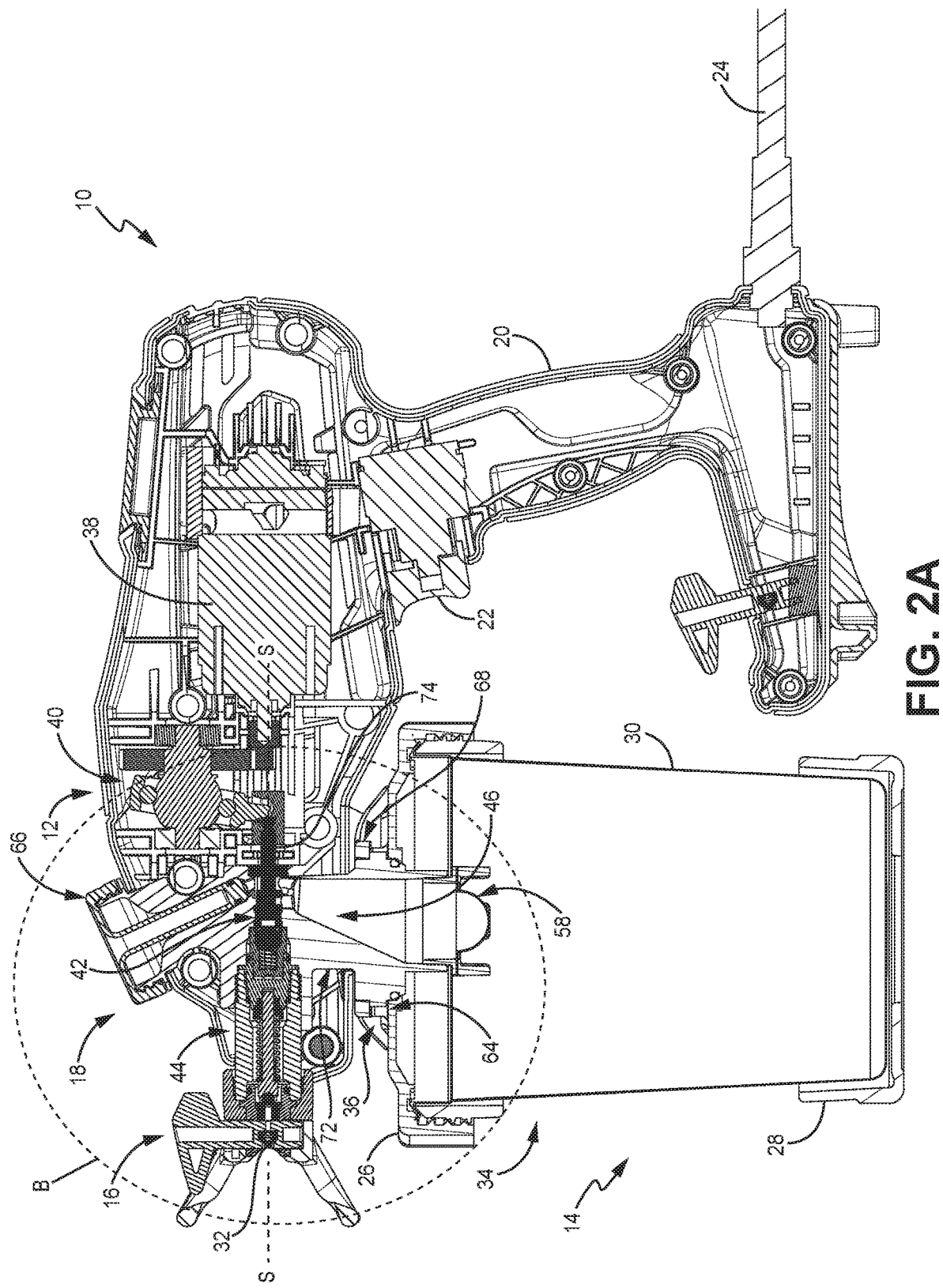
FIG. 2A is a cross-sectional view taken along line 2-2 in FIG. 1.
Figure 2B:
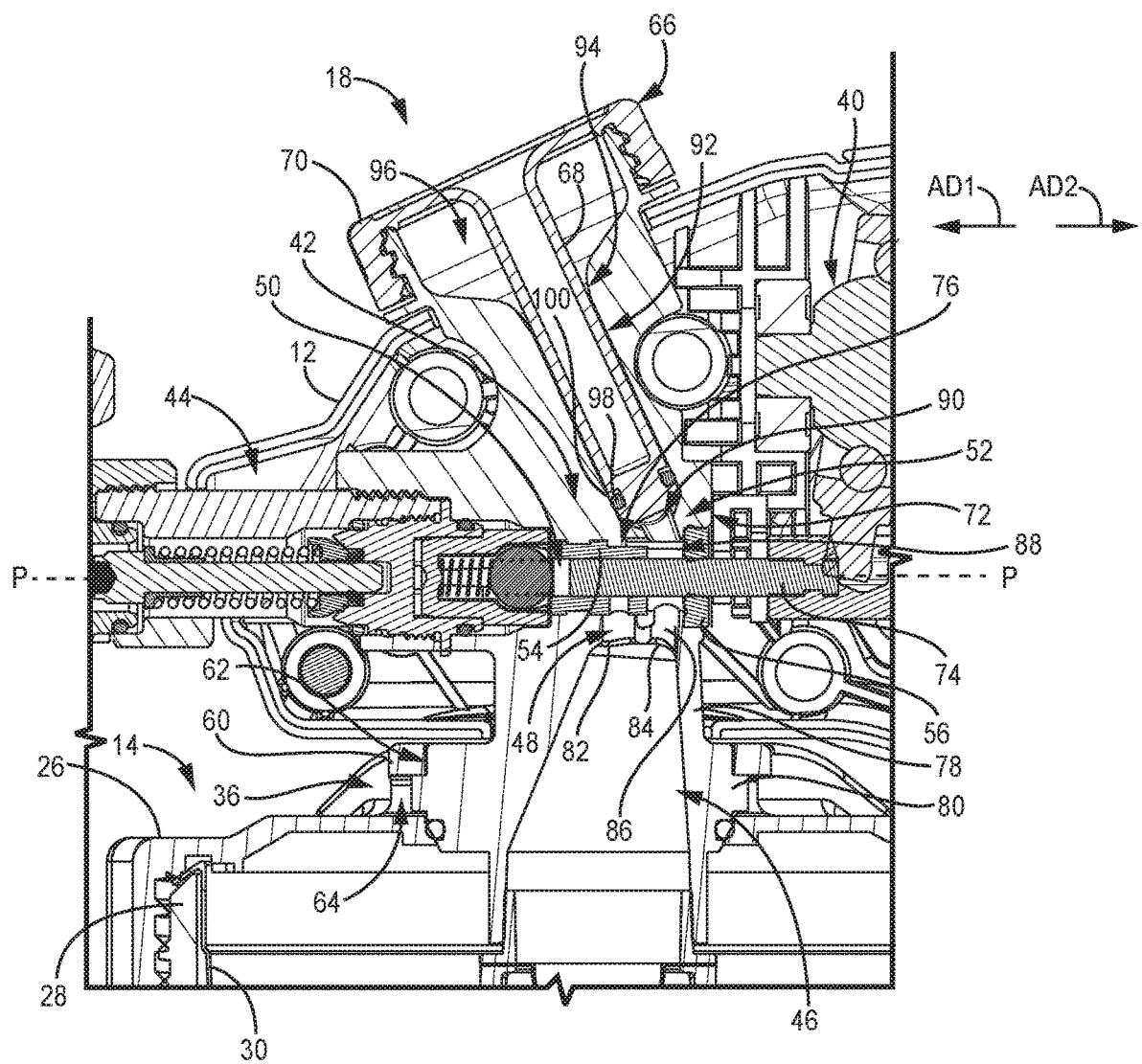
FIG. 2B is an enlarged view of detail B in FIG. 2A.

FIG. 2A is a cross-sectional view taken long line 2-2 in FIG. 1. FIG. 2B is an enlarged view of detail B in FIG. 2A. FIGS. 2A and 2B will be discussed together. Sprayer 10 includes housing 12, reservoir 14, spray tip 16, priming valve 18, handle 20, trigger 22, power source 24, interface 36, motor 38, drive 40, pump 42, outlet valve 44, fluid inlet 46, pump supply channel 48, pump chamber 50, secondary channel 52, cylinder 54, throat seal 56, and filter 58. Reservoir 14 includes lid 26, cup 28, and liner 30. Cup 28 includes windows 34. Lid 26 includes collar 60, aperture 62, and slots 64. Priming valve 18 includes valve member 66. Valve member 66 includes valve shaft 68 and valve cap 70. Pump 42 includes pump body 72 and piston 74. Pump body 72 includes piston bore 76, neck 78, and projections 80. Pump supply channel 48 includes inlet 82. Secondary channel 52 includes inlet 84, bypass channel 86, rear chamber 88, priming channel 90, valve channel 92, orifice 94 and pooling chamber 96.

Housing 12 supports other components of sprayer 10. Motor 38 is disposed in housing 12 and is configured to generate a rotational output. Motor 38 can be activated to generate the output by actuation of the trigger 22. Motor 38 is an electric motor and can be a brushless direct current motor, among other options. Drive 40 is connected to motor 38 to receive the rotational output from motor 38. Drive 40 is connected to pump 42 to provide a linear reciprocating input to piston 74. Drive 40 is configured to convert the rotational output from motor 38 into a reciprocating linear input to drive reciprocation of piston 74 along pump axis P-P and cause pumping by pump 42. In the example shown, drive 40 is a wobble drive, through it is understood that drive 40 can be of any configuration suitable for converting the rotational output of motor 38 into linear motion of piston 74. In the example shown, drive 40 is connected to a rear end of piston 74 and pushes and pulls that end of piston 74 to cause piston 74 to reciprocate along pump axis P-P. In some examples, piston axis P-P is coaxial with spray axis S-S.

Pump 42 is at least partially disposed within housing 12 and is configured to draw spray fluid from reservoir 14 and drive the spray fluid through nozzle 32 for spraying. Pump 42 includes piston 74 and is configured to put the spray fluid under pressure (e.g., about 3.44-34.47 megapascal (MPa) (about 500-5000 pounds per square inch (psi))) to generate the atomized fluid spray. In the example shown, sprayer 10 is an airless sprayer which means that sprayer 10 does not utilize air flow to propel the spray fluid. Instead, the pressures generated by pump 42 cause the atomization and spraying. It is understood that, in some examples, sprayer 10 can include air to atomize, shape, and/or guide the spray fluid. In some examples, motor 38 can drive rotation of a turbine to generate a flow of air to atomize the fluid for spraying through nozzle 32.

Pump body 72 is at least partially disposed within housing 12. Pump body 72 at least partially houses other components of pump 42. Pump body 72 can be a polymer housing configured to contain various components of pump 42, among other material options. In the example shown, pump body 72 extends out two sides of housing 12. Pump body 72 extends out of opposite vertical sides of housing 12. Neck 78 extends through a lower side of housing 12. A portion of pump body 72 associated with priming valve 18 extends out of an upper side of housing 12. Fluid inlet 46 extends into pump body 72 and is at least partially formed through neck 78. Fluid inlet 46 is configured to receive spray fluid from reservoir 14.

Piston 74 extends into piston bore 76 and is configured to reciprocate within piston bore 76. Cylinder 54 is disposed in piston bore 76 and piston 74 is at least partially disposed within cylinder 54. Cylinder 54 can be a sleeve formed from metal or other hard material. In some examples, cylinder 54 can be formed from carbide. Piston 74 can similarly be formed from a metal or other hard material. In some examples, piston 74 can be formed from carbide. Piston 74 is configured to reciprocate along pump axis P-P during operation to pump spray fluid from reservoir 14 through nozzle 32.

Piston 74 seals tightly with cylinder 54 such that spray fluid does not migrate around piston 74 between pump chamber 50 and rear chamber 88. Cylinder 54 includes an opening that piston 74 covers and uncovers during reciprocation. The opening forms a portion of the pump supply channel 48 between reservoir 14 and pump chamber 50. Piston 74 uncovering the opening allows spray fluid to enter pump chamber 50. Piston 74 covering the opening prevents the spray fluid from backflowing and allows piston 74 to pressurize the spray fluid and drive the spray fluid downstream to nozzle 32 for spraying.

Throat seal 56 is disposed within piston bore 76 at an opposite end of piston bore 76 from cylinder 54. Piston 74 extends through throat seal 56. Throat seal 56 can be formed from rubber or other flexible material that dynamically seals with piston 74 as piston 74 reciprocates. Throat seal 56 seals piston bore 76 to prevent any fluid from leaking out of piston bore 76, specifically out of rear chamber 88, and into housing 12.

Piston 74 cyclically increases and decreases the volume of pump chamber 50 to pump the fluid. Piston 74 is drawn in second axial direction AD2 during a suction stroke, during which the volume of pump chamber 50 increases and spray fluid enters pump chamber 50. Piston 74 is driven in first axial direction AD1 during a pumping stroke, during which the volume of pump chamber 50 decreases and spray fluid is evacuated from pump chamber 50 and driven downstream through outlet valve 44 to nozzle 32.

Outlet valve 44 is disposed downstream of pump 42 and pump chamber 50. Outlet valve 44 contains a spring-biased needle that opens to release fluid from the nozzle 32 when the pressure of the paint developed by pump 42 reaches a threshold amount, overcoming the force exerted by the spring. Other outlet valve 44 designs and methods of operation are possible.

Nozzle 32 is disposed downstream of outlet valve 44. Nozzle 32 is configured to atomize the spray fluid pumped by pump 42 to generate the fluid spray. Nozzle 32 is disposed within spray tip 16 and is removable with spray tip 16. Spray tip 16 is rotatably disposed within a tip bore. Spray tip 16 can be removed and replaced with another spray tip of the same or a different configuration, such as one that generates a different spray pattern. Spray tip 16 can be rotated 180-degrees between the spray position (shown in FIGS. 2A and 2B) and the de-clog position.

Reservoir 14 is removably mounted to sprayer 10. A reservoir mount interfaces with a sprayer mount at interface 36 to connect reservoir 14 to sprayer 10. In the example shown, reservoir 14 is removably mounted to neck 78 of pump body 72. It is understood that, in some examples, reservoir 14 can be directly connected to housing 12. Spray fluid flows through filter 58, which prevents clots and other clogs from entering pump 42.

Lid 26 is connected to neck 78 by projections 80 interfacing with slots 64 formed in lid 26. Cup 28 is connected to lid 26. In the example shown, cup 28 is removably connected to lid 26. Cup 28 can be connected to lid 26 by interfaced threading, among other connection type options. Liner 30 is disposed within cup 28. The top of liner 30 is pinched between the lip of cup 28 and lid 26 to create an annular seal between liner 30 and lid 26. Liner 30 is flexible and can be formed from a flexible polymer. For example, liner 30 can be a bag configured to hold a supply of the spray fluid. Windows 34 are formed in cup 28. Windows 34 allow access to the interior of cup 28 with cup 28 connected to lid 26. The user can access liner 30 while reservoir 14 is assembled together to manually squeeze liner 30 and force air and spray fluid out of reservoir 14 to prime pump 42.

Lid 26 attaches to and seal with pump body 72 to mount reservoir 14 to sprayer 10. More specifically, neck 78 extends into collar 60 and is received by aperture 62 of lid 26. Neck 78 and lid 26 are connected at interface 36. Interface 36 locks reservoir 14 to sprayer 10 such that reservoir 14 is fully supported by sprayer 10. Interfacing of the interior of collar 60 and the exterior of the neck 78 forms a seal therebetween such that the contents of the liner 30 can only flow through aperture 62 and to fluid inlet 46. Interface 36 can be formed in any desired manner suitable for locking reservoir 14 relative housing 12 and forming a flowpath therethrough for spray fluid to flow from reservoir 14 to pump 42. In the example shown, lid 26 and neck 78 are connected by a bayonet-type connection with projections 80 extending from neck 78 being disposed in slots 64 formed in collar 60. It is understood that interface 36 can be formed in any desired manner, such as by interfaced threading, among other options.

Reservoir 14 is detachable from sprayer 10. In the example shown, reservoir 14 can be rotated relative neck 78 to disengage projections 80 and slots 64 and then pulled away from housing 12. Neck 78 is withdrawn from aperture 62, which allows for reservoir 14 to be refilled with additional spray fluid through aperture 62, as discussed in more detail below. Reservoir 14 can then be reattached to sprayer 10, pump 42 can be primed, and sprayer 10 is again ready for spraying.

With neck 78 disposed within aperture 62, the reservoir 14 includes only one outlet for the spray fluid to exit reservoir 14, which is aperture 62. Therefore, sprayer 10 can be turned upside down or in any orientation and the spray fluid is limited to move only into fluid inlet 46. The liner 30 collapses as paint is withdrawn from the reservoir 14. Ideally, all air is removed from the liner 30 and fluid inlet 46 before and/or during priming of pump 42 so that pump 42 does not lose its prime during spraying, particularly during inversion of sprayer 10.

Priming valve 18 is mounted to sprayer 10. In the example shown, priming valve 18 is mounted to and includes a portion of pump body 72. It is understood that priming valve 18 can additionally or alternatively be formed through housing 12 or be mounted to housing 12. Priming valve 18 facilitates removal of air from reservoir 14 to prime pump 42 for operation. Secondary channel 52 is in fluid communication with atmosphere with priming valve 18 in an open state and is isolated from atmosphere with priming valve 18 in a closed state.

Valve member 66 includes valve shaft 68 and valve cap 70. Valve shaft 68 extends into valve channel 92 of secondary channel 52 and occupies the volume of valve channel 92. Valve shaft 68 extending into valve channel 92 minimizes the volume of spray fluid within secondary channel 52 and prevents spray fluid from residing in valve channel 92 during operation of sprayer 10. Valve cap 70 encloses pooling chamber 96 and prevents spray fluid from leaking from pooling chamber 96. Valve cap 70 enclosing pooling chamber 96 also prevents the spray fluid from drying within pooling chamber 96.

Valve cap 70 secures valve member 66 to sprayer 10. In the example shown, valve cap 70 is connected to the wall defining pooling chamber 96. In the example shown, pooling chamber 96 is formed in pump body 72 and valve cap 70 is connected to pump body 72. Valve member 66 can be secured to sprayer 10 in any desired manner. For example, valve cap 70 can be connected by interfaced threading, a snap connection, a press-fit connection, a bayonet-type connection, or in any other desired manner. In some examples, valve cap 70 can be rotated less than a full turn between unlocked and locked states. For example, valve cap 70 can be connected by a quarter-turn threaded connection where valve cap 70 is rotated about 90-degrees between the locked and unlocked states.

Fluid inlet 46 is positioned to receive spray fluid from reservoir 14. Fluid inlet 46 branches into two (and in this embodiment only two) fluid pathways: the pump supply channel 48 and secondary channel 52. Pump supply channel 48 supplies spray fluid to pump 42, specifically pump chamber 50, while secondary channel 52 bypasses pump chamber 50. In some examples, secondary channel 52 bypasses pump 42 entirely. Pump supply channel 48 extends through pump body 72 to pump chamber 50. Pump supply channel 48 and secondary channel 52 do not intersect and are not fluidly connected, except that each of pump supply channel 48 and secondary channel 52 branch from fluid inlet 46. In various embodiments, as shown, the pump supply channel 48 and secondary channel 52 are the only branches from the fluid inlet 46. In various examples, as shown, the fluid inlet 46 is the only spray fluid inlet into the main body of the sprayer 10 (e.g., from the reservoir 14) while the nozzle 32 (via pump supply channel 48, pump 42, and outlet valve 44) and the priming valve 18 (via the secondary channel 52) are the only outlets for the spray fluid. In some examples, secondary channel 52 and pump supply channel 48 branch at a location upstream of pump body 72 and/or from within a component other than pump body 72. Inlet 82 of pump supply channel 48 can be located a further radial distance from pump axis P-P than inlet 84 of secondary channel 52. In some examples, inlet 82 of pump supply channel 48 is located at the same radial distance from pump axis P-P as the inlet 84 of secondary channel 52.

Secondary channel 52 provides a pathway for air and spray fluid to exit reservoir 14 during priming of pump 42. Secondary channel 52 extends through pump body 72 from fluid inlet 46 to an opposite side of pump 42 from reservoir 14. Secondary channel 52 extends from a same side of a horizontal plane aligned on pump axis P-P as reservoir 14 to an opposite side of the horizontal plane from reservoir 14. In the example shown, secondary channel 52 extends from below pump 42 to above pump 42. Secondary channel 52 extends from below pump chamber 50 and piston 74 to above pump chamber 50 and piston 74. In examples where reservoir 14 is mounted on a top side of sprayer 10, secondary channel 52 can extend from above pump 42 to below pump 42. Secondary channel 52 can extend from above pump chamber 50 and piston 74 to below pump chamber 50 and piston 74. Secondary channel 52 extends from a same side of pump axis P-P as reservoir 14 to an opposite side of pump axis P-P from reservoir 14.

In sequence, secondary channel 52 includes bypass channel 86, rear chamber 88, priming channel 90, valve channel 92, orifice 94, and pooling chamber 96. In the example shown, secondary channel 52 extends between fluid inlet 46 and pooling chamber 96. Secondary channel 52 includes a bypass channel 86 on a first side of pump 42 and priming channel 90 and valve channel 92 on a second side of pump 42. Bypass channel can be considered to form an upstream portion of secondary channel 52. Priming channel 90 and valve channel 92 can be considered to form a downstream portion of secondary channel 52. Secondary channel 52 can be the only pathway between fluid inlet 46 and priming valve 18. In the example shown, secondary channel 52 is the only pathway between fluid reservoir 14 and priming valve 18. The secondary channel 52 may not have any branches or fluid loss between the fluid inlet 46 and priming valve 18.

Rear chamber 88 is disposed between bypass channel 86 and priming channel 90. Rear chamber 88 annularly surrounds piston 74. In the example shown, rear chamber 88 is at least partially defined by pump body 72. Rear chamber 88 is disposed axially between an end of cylinder 54 and throat seal 56. In the example shown, the outer walls of rear chamber 88 are not defined by cylinder 54. It is understood, however, that in some examples the outer walls of rear chamber 88 can be defined by cylinder 54. As such, at least a portion of secondary channel 52 can, in some examples, be formed by cylinder 54.

Rear chamber 88 forms a portion of secondary channel 52 between reservoir 14 and priming valve 18. Fluid can be forced into and through rear chamber 88 during priming. The fluid in rear chamber 88 can contact piston 74 as piston reciprocates. However, piston 74 does not pump fluid through rear chamber 88 or pressurize the fluid in rear chamber 88. The forward, pumping end of piston 74 does not pass into or through rear chamber 88 during pumping. Piston 74 seals tightly with cylinder 54 such that fluid does not migrate around piston 74 between pump chamber 50 and rear chamber 88. Piston 74 does not pump fluid through any portion of secondary channel 52 and does not pressurize secondary channel 52.

While secondary channel 52 is described as including a portion through which piston 74 extends, it is understood that secondary channel 52 can fully bypass piston 74. And while the illustrated embodiment shows the secondary channel 52 extending to and including rear chamber 88 that surrounds the piston 74 and that contacts the rear of the cylinder 54, secondary channel to priming valve 18 may avoid pump 42 altogether. Secondary channel 52 may not extend through pump 42. Secondary channel 52 may not contact or otherwise intersect with the piston 74. For example, the secondary channel 52 may be routed entirely around the piston 74 through the pump body 72. It is understood, however, that secondary channel 52 can be formed through a variety of components assembled together to form a pathway for air and fluid migration during priming. In some cases, secondary channel 52 may not extend through the pump body 72. In such a case, the secondary channel 52 may extend within the housing 12 but may not extend through pump body 72. In such a case, the secondary channel 52 may be defined by a hose within the housing 12 that extends to priming valve 18. In some examples, valve channel 92 can be formed by a separate component that extends to and interfaces with pump body 72, such as a tube, while priming channel 90 can be formed in pump body 72. Pooling chamber 96 can be formed from the same or a different part than the tube defining valve channel 92. In the example shown, pooling chamber 96 is formed by a portion of pump body 72.

During operation, reservoir 14 is filled with spray fluid and connected to sprayer 10. Air is present within reservoir 14 between the top surface of the spray fluid in liner 30 and lid 26. The air must be removed from reservoir 14 for efficient operation and to prevent stalling and sputtering. Pump chamber 50 is also initially filled with air and must be primed with spray fluid. Reciprocation of piston 74 may not generate sufficient pressures when pump chamber 50 is filled with air to overcome the force of outlet valve 44 (or other valving) which would allow for evacuation of the air from pump chamber 50. Piston 74 may not be able to pull spray fluid from reservoir 14, up fluid inlet 46, and into pump chamber 50 due to the air gap.

Liner 30 can be compressed force air and spray fluid within liner 30 up the fluid inlet 46 and through each of pump supply channel 48 and secondary channel 52. For example, liner 30 can be squeezed manually through windows 34, though other options, such as mechanical or pneumatic compressing, can be utilized. Without secondary channel 52, air within reservoir 14 and fluid inlet 46 would block spray fluid from entering pump supply channel 48 and pump chamber 50. The air is compressed and pressurized due to the reduced volume along fluid inlet 46 and pump supply channel 48 and the force of the spray fluid below the air. Pump 42 can be operated to try and pull some of the air and then spray fluid through the pump supply channel 48, but this may be a long process due to the long distance that the spray fluid must be pulled through the stalled pump supply channel 48 and the pump 42 still not being primed. Without secondary channel 52, the squeezing of the liner 30 may only allow the spray fluid to be forced far enough into fluid inlet 46 and/or pump supply channel 48 for priming to be effective, increasing the difficulty of the priming process.

Secondary channel 52 facilitates priming of pump 42. Secondary channel 52 allows the air and spray fluid to continue to be forced out of reservoir 14. Secondary channel 52 extends beyond pump 42, beyond piston 74, cylinder 54, and pump chamber 50, ensuring that continued squeezing drives spray fluid to the highest possible point in pump supply channel 48. Secondary channel 52 extends to an opposite side of pump axis P-P from reservoir 14. This drives spray fluid further into pump supply channel 48, minimizing the volume of the air gap in pump supply channel 48, facilitating pump 42 pulling the spray fluid into pump chamber 50 and driving any air and spray fluid out through outlet valve 44. Specifically, air and paint can be squeezed through the secondary channel 52, into the rear chamber 88, and out the priming channel 90. As shown, the rear chamber 88 is equal in height to the pump chamber 50 and the priming channel 90 is disposed on an opposite side of pump axis P-P from pump supply channel 48. Priming channel 90 is thereby higher relative to the pump chamber 50. Forcing air and spray fluid up the priming channel 90 by squeezing the liner 30, such that the spray fluid level along the secondary channel 52 is higher than the pump 42 and the spray fluid along the pump supply channel 48 is as close to the pump 42 as possible, makes it easier for the pump 42 to pull any remaining air in the pump supply channel 48 through the pump 42 to prime the pump 42.

Most or all of the air is evacuated through priming valve 18. As such, the air, if any, remaining in the fluid handling parts of sprayer is minimized.

During priming, valve member 66 is removed from sprayer 10 to open priming valve 18. Priming valve 18 is open prior to and/or during priming and then returned to a closed, sealed state during spraying. For example, valve member 66 can be rotated to unthread valve cap 70 from pump body 72. Valve member 66 can then be pulled away from sprayer 10 and valve shaft 68 is withdrawn from valve channel 92. With valve member 66 removed, priming valve 18 is open and air and spray fluid can be evacuated through priming valve 18. Priming valve 18 being in the closed state prevents air from reentering the fluid handling parts of sprayer 10.

As liner 30 is squeezed, air and spray fluid flow through bypass channel 86, through rear chamber 88, and to priming channel 90. The air and spray fluid flow to and through valve channel 92 and to orifice 94. The air is exhausted and is driven through secondary channel 52 by the force of the spray fluid behind the air. The presence of spray fluid at orifice 94 indicates to the user that the air has been successfully evacuated and that priming valve 18 can be returned to the closed state. Any spray fluid that moves beyond orifice 94 from valve channel 92 can pool within pooling chamber 96. Pooling chamber 96 has a larger diameter than orifice 94. The spray fluid within pooling chamber 96 can provide further visual confirmation to the user that air has been evacuated and the spray fluid is positioned as close as possible to pump chamber 50. Pooling chamber 96 capturing the spray fluid also prevents spray fluid from spilling onto or out of sprayer 10, thereby facilitating easy clean up and avoiding undesired mess. The smaller diameter of orifice 94 and secondary channel 52 relative pooling chamber 96 further prevents the spray fluid from being quickly sucked back down secondary channel 52 if/when the squeezing pressure on liner 30 is released prior to priming valve 18 being closed.

Priming valve 18 is placed in the closed state once the air is evacuated and the spray fluid is placed as close as possible to pump chamber 50. Priming valve 18 is a manual valve that can be closed by the user. Specifically, the user inserts valve member 66 and secures valve member 66 relative sprayer 10. Valve shaft 68 is inserted into valve channel 92 and pushed through valve channel 92. Valve shaft 68 can be considered to be a plunger configured to drive spray fluid through valve channel 92. Shaft seal 98 is disposed around the distal end 100 of valve shaft 68 and engages the walls defining valve channel 92. Seal 98 prevents fluid within secondary channel 52 from flowing around valve shaft 68. Instead, valve shaft 68 drives the fluid within valve channel 92 downwards within secondary channel 52. Valve shaft 68 removes any fluid residing within valve channel 92 and occupies most or all of the volume of valve channel 92. Valve member 66 thereby minimizes the volume of spray fluid residing in secondary channel 52 while priming valve 18 is closed. Valve shaft 68 further fluidly isolates pooling chamber 96 from priming channel 90 when priming valve 18 is closed. Valve cap 70 seals pooling chamber 96 and prevents ambient air from entering into pooling chamber 96. Valve cap 70 also prevents spray fluid from exiting pooling chamber 96. With priming valve 18 in the closed state, a portion of priming valve 18 is disposed within housing 12 and another portion is disposed outside of housing 12. A portion of valve member 66 extends through pooling chamber 96 and another portion is disposed outside of pooling chamber 96. The connecting portion of valve cap 70 and valve shaft 68 extend in the same direction from a body of valve cap 70.

With priming valve 18 in the closed state, secondary channel 52 is isolated from atmosphere and closed. Atmospheric air cannot enter into secondary channel 52 when priming valve 18 is in the closed state. Spray fluid remains in priming channel 90, rear chamber 88, and bypass channel 86. The spray fluid remains within pump supply channel 48 because all pathways are sealed when priming valve 18 is in the closed state. Reservoir 14 is sealed, outlet valve 44 is sealed except for during spraying, and priming valve 18 is sealed. As such, spray fluid cannot enter the fluid circuit and de-prime pump 42. With air prevented from entering the fluid pathways, the vacuum created by pump 42 during the suction stroke pulls spray fluid through the pump supply channel 48 while the liner 30 collapses, where air might otherwise stall the vacuum and flow of spray fluid. The air is expelled and spray fluid is pulled into pump chamber 50 on subsequent strokes. Sprayer 10 applies the spray fluid and continues to spray until reservoir 14 requires replacement.

Reservoir 14 is removed and replaced after depleting the supply of spray fluid within reservoir 14. During removal, valve member 66 is preferably removed prior to removing reservoir 14. First removing valve member 66 allows the suction in liner 30 to draw spray fluid out of secondary channel 52 and pooling chamber 96, thereby evacuating secondary channel 52. In some instances, valve member 66 may not be removed until after reservoir 14 has been refilled and reattached to sprayer 10. In such a case, a column of fluid resides in secondary channel 52 above the air within reservoir 14. Squeezing the liner 30 to re-prime pump 42 will cause that column of fluid to exit secondary channel 52 before the air is evacuated. Having a large column of spray fluid in secondary channel 52 above the air can prematurely indicate evacuation of air and can lead to bubbling and sputtering of the fluid in pooling chamber 96 as air is forced through the fluid, which can cause undesired mess and hazards. The volume of spray fluid within secondary channel 52 can also be ejected as a jet of fluid depending on the force exerted on liner 30, which can also cause undesired mess and hazards.

Valve shaft 68 extends through and occupies valve channel 92 to minimize the volume of spray fluid residing in secondary channel 52. As such, only the small volume of fluid in bypass channel 86, rear chamber 88, and priming channel 90 will remain in secondary channel 52 if reservoir 14 is removed and replaced prior to opening priming valve 18. The larger length and volume of valve channel 92 as compared to the other portions of secondary channel 52 ensures that only a small volume of fluid remains within secondary channel 52 when priming valve 18 is closed. As such, the user does not have to force a large volume of spray fluid from secondary channel 52 before air begins to exhaust through priming valve 18. The small volume residing in secondary channel 52 can be forced to pooling chamber 96 and does not create a jet of fluid when liner is squeezed.

Valve member 66 occupying valve channel 92 facilitates re-priming of pump 42 after removal, refill, and replacement of reservoir 14.

Figure 3A:
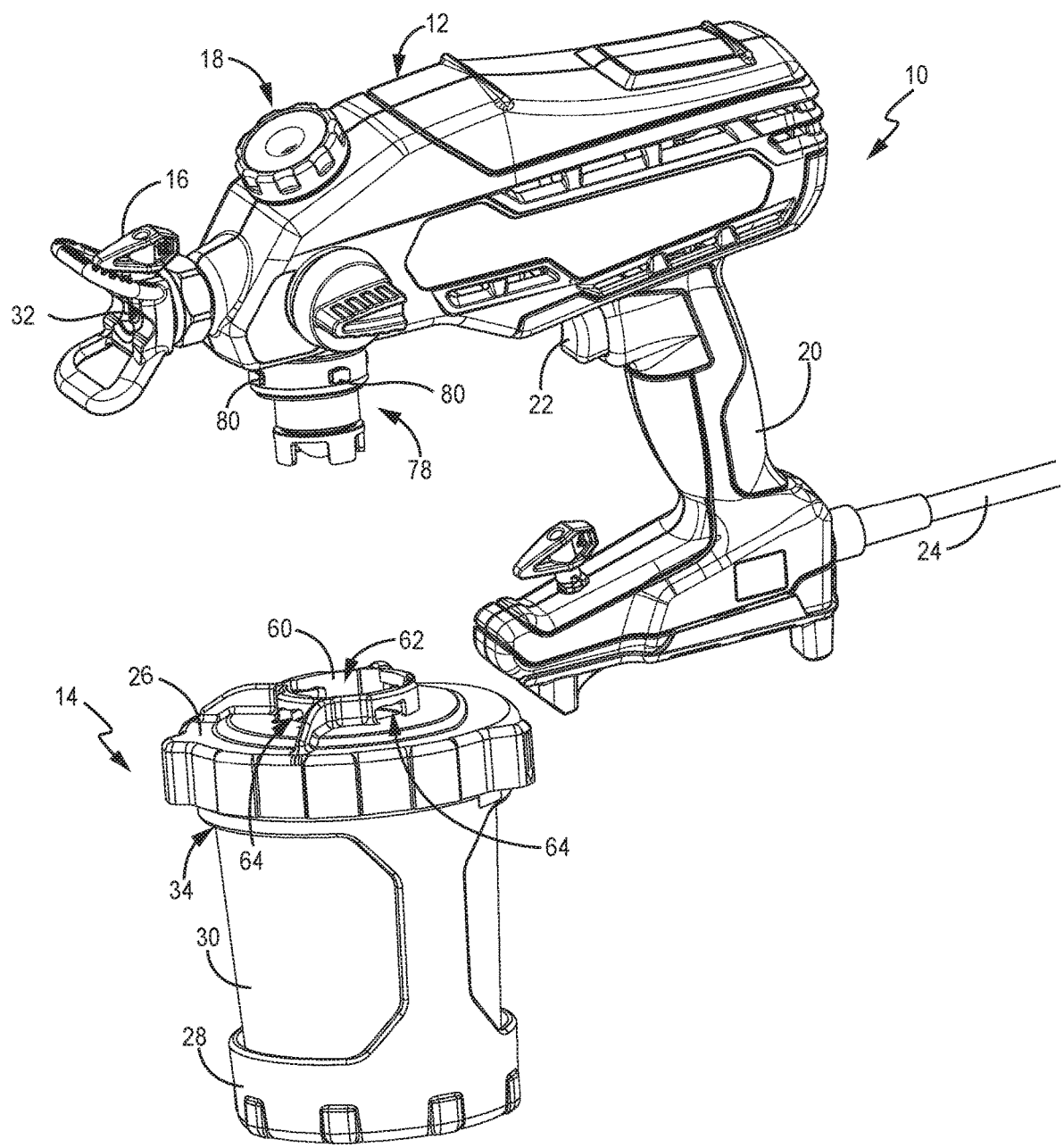
FIG. 3A is an isometric view showing a reservoir exploded from a handheld fluid sprayer.
Figure 3B:
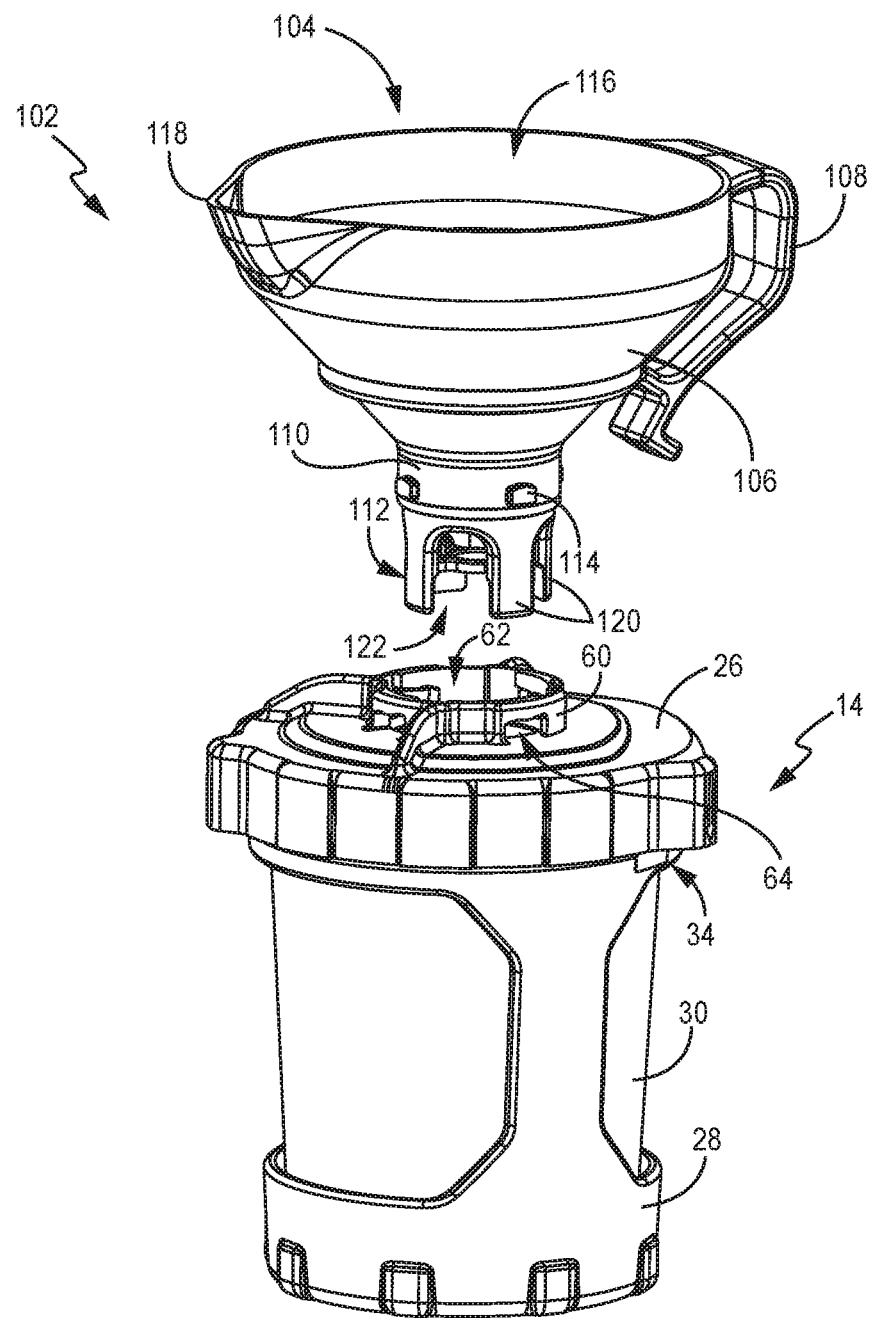
FIG. 3B is an isometric view showing a filling device exploded from a reservoir.

FIG. 3A is an isometric exploded view showing reservoir 14 removed from sprayer 10. FIG. 3B is an isometric exploded view showing funnel 104 of a filling device 102 positioned relative reservoir 14. Funnel 104 includes funnel body 106, handle 108, neck 110, crown 112, funnel projections 114, upper opening 116, and spout 118. Crown 112 is formed by prongs 120. Reservoir 14 includes cup 28, liner 30, and lid 26. Cup 28 includes windows 34. Lid 26 includes collar 60, aperture 62, and slots 64.

Reservoir 14 can be removed from sprayer 10 and refilled with spray fluid when the spray fluid has been depleted from reservoir 14. Reservoir 14 is rotated relative to sprayer 10 to disengage projections 80 from within slots 64. Reservoir 14 is pulled vertically away from sprayer 10 such that neck 78 is withdrawn from lid 26 through aperture 62. Aperture 62 is the only opening through reservoir 14 through which spray fluid can enter or exit reservoir 14. Reservoir 14 can be refilled with spray fluid through aperture 62. However, aperture 62 is a relatively small opening that can make it difficult to cleanly and efficiently pour spray fluid directly into liner 30 through aperture 62.

Filling device 102 can be utilized to cleanly and efficiently provide refill spray fluid to reservoir 14. Funnel body 106 includes an upper opening 116 that is significantly wider than that of aperture 62. Funnel body 106 reduces in diameter between the upper opening 116 and neck 110. Neck 110 is disposed at an end of funnel body 106 opposite upper opening 116. Funnel projections 114 extend laterally from neck 110. Funnel projections 114 are configured to engage within slots 64 formed in collar 60 to secure filling device 102 to reservoir 14. Crown 112 projects vertically downward from neck 110. Crown 112 is formed by prongs 120 alternating with voids 122. Funnel 104 can contain the same number of funnel projections 114 as sprayer 10 includes projections 80. Crown 112 is configured to extend into the interior of reservoir 14 and can push liner 30 away from the opening through neck 110 to facilitate flow of spray fluid into reservoir 14. Handle 108 is connected to funnel body 106 and can be grasped by a single hand of the user to manipulate filling device. Spout 118 is formed at an opposite side of funnel body 106 from handle 108.

Funnel 104 is configured to connect to reservoir 14 in the same manner that sprayer 10 connects to reservoir 14. Funnel 104 is positioned relative reservoir 14 as shown in FIG. 3B. Funnel 104 is lowered towards reservoir 14 such that neck 110 extends into aperture 62 through collar 60. Crown 112 can be the first portion of filling device 102 to enter through aperture 62. Funnel projections 114 interface with slots 64. Funnel 104 is rotated relative to reservoir 14 to lock funnel projections 114 within slots 64. Funnel projections 114 interface with slots 64 and lock within slots 64 in the same manner that projections 80 interface with slots 64 and lock within slots 64. Funnel projections 114 form locking features for connecting filling device 102 to lid 26. Funnel 104 can engage with reservoir in a bayonet-type connection. It is understood, however, that other connection types are possible, such as by interfaced threading where collar 60 includes threading. Funnel 104 can be configured to connect to reservoir 14 in any manner, which may be compatible with the connecting interface between reservoir 14 and sprayer 10.

Figure 4A:
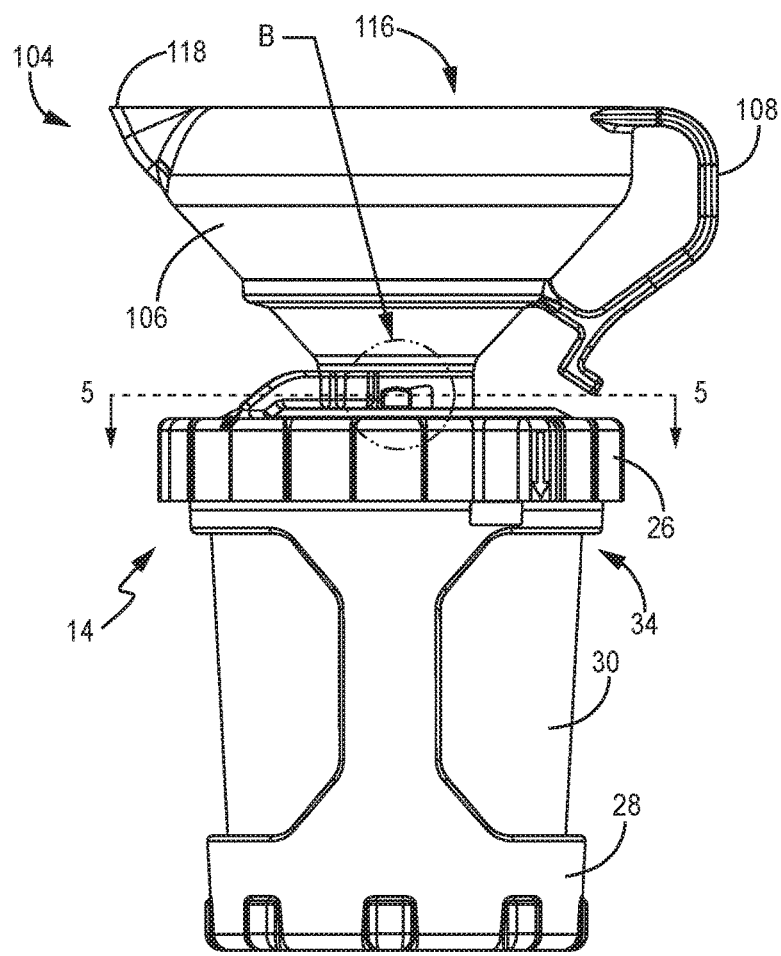
FIG. 4A is a side elevation view showing a filling device mounted to a reservoir.
Figure 4B:
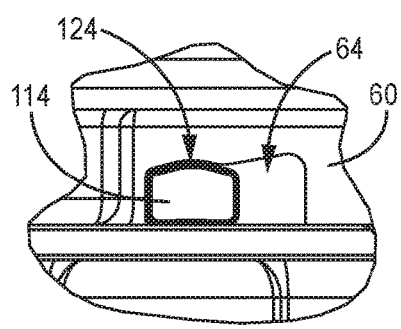
FIG. 4B is an isometric view showing a filling device mounted to a reservoir.
Figure 4C:
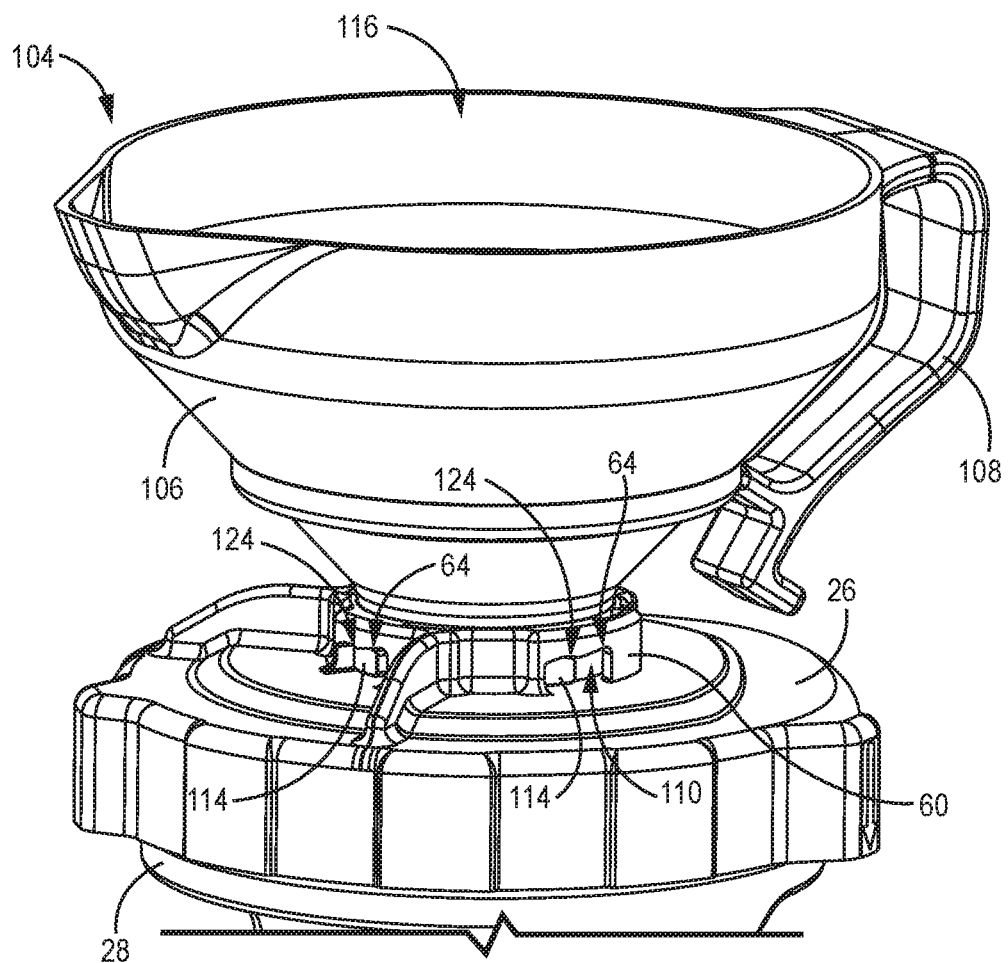
FIG. 4C is an enlarged view of detail C in FIG. 4A.

FIG. 4A is a side elevation view showing filling device 102 mounted to reservoir 14. FIG. 4B is an enlarged, partial isometric view showing filling device 102 mounted to reservoir 14. FIG. 4C is an enlarged view of detail C in FIG. 4A. FIGS. 4A-4C will be discussed together. Funnel body 106, handle 108, funnel projections 114, upper opening 116, and spout 118 of filling device 102 are shown. Reservoir 14 includes cup 28, liner 30, and lid 26. Cup 28 includes windows 34. Collar 60 and slots 64 of lid 26 are shown. Slots 64 include detents 124.

Funnel 104 is shown as mounted to lid 26. Neck 110 extends through collar 60. Funnel projections 114 are disposed in slots 64. Funnel projections 114 are disposed within detents 124 formed in slots 64. Detents 124 rotationally secure filling device 102 relative reservoir 14. Detents 124 lock filling device 102 relative reservoir 14 to prevent unintended rotation of filling device 102 between the locked state (shown in FIGS. 4A-4C) and an unlocked state where filling device 102 can be removed from reservoir 14.

With funnel 104 connected to reservoir 14, reservoir 14 can be supported by funnel 104. For example, lifting and supporting funnel 104 alone, such as via handle 108, also lifts reservoir 14. In some examples, a single hand of the user can be used to grasp, and hold handle 108, without the user touching reservoir 14, but reservoir 14 is still supported and moved via connection between lid 26 and funnel 104. The user can thereby support and position funnel 104 and reservoir 14 with a single hand. Supporting and positioning funnel 104 and reservoir 14 with a single hand allows the user to pour spray fluid with the user's free hand. The user can pour the spray fluid into funnel through upper opening 116. Funnel body 106 channels the spray fluid into reservoir 14.

Once the reservoir 14 is filled to a desired level, the user can rotate funnel 104 relative reservoir 14 from the locked state to the unlocked state. For example, the user can rotate funnel 104 such that funnel projections 114 are removed from detents 124 and instead aligned with vertically extending portions of the slots. Funnel 104 can be removed from reservoir 14 when in the unlocked state. For example, funnel 104 can be lifted vertically away from reservoir 14 to fully remove funnel projections 114 from slots 64, releasing funnel 104 from reservoir 14. The refilled reservoir 14 can then be reattached to sprayer 10 and spraying can be resumed.

Figure 5:
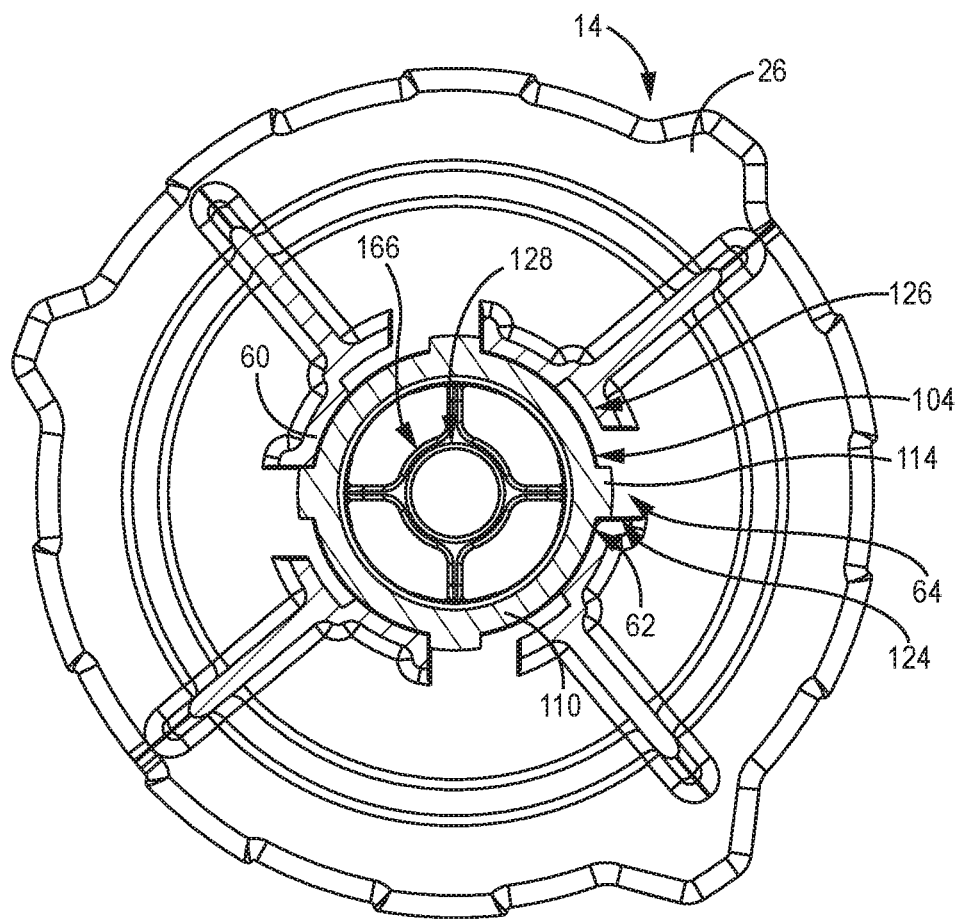
FIG. 5 is a cross-sectional view showing an interface between a filling device and a reservoir.

FIG. 5 is a cross-sectional view taken along line 5-5 in FIG. 4A. Filling device 102 is shown in the locked state with funnel projections 114 disposed in detents 124. As shown, funnel 104 includes an annular array of funnel projections 114 and lid 26 includes a corresponding annular array of slots 64. Funnel projections 114 are first lowered into slots 64 through vertical portions. Funnel projections 114 can bottom out within slots 64 to indicate that funnel 104 is fully inserted into aperture 62. Funnel 104 is then rotated relative reservoir 14 to position funnel projections 114 within detents, thereby locking funnel 104 to reservoir 14. A portion of filter assembly 128, discussed in more detail below, is also shown. The portion is part of a vent tube extending through locating ring 166 formed within filter neck 110.

FIG. 6A is an isometric view of filter assembly 128. FIG. 6B is a side elevation view of filter assembly 128. FIGS. 6A and 6B will be discussed together. Filter assembly 128 is configured to mount within funnel 104 (best seen in FIGS. 7 and 8A) to form filling device 102. Filter assembly 128 includes vent tube 130 and filter disk 132. Vent tube 130 includes upper portion 134 and lower portion 136. Upper portion 134 includes tube ring 138. Lower portion 136 includes taper 140 and tube prongs 142. Filter disk 132 includes screen 144, fitting ring 146, and guide ring 148.

Filter assembly 128 is configured to mount within funnel 104 and to filter out clots from the spray fluid entering reservoir 14 during the refill process. Vent tube 130 is an open tube that extends vertically, both up and down, from filter disk 132. Upper portion 134 extends vertically above filter disk 132. Lower portion 136 extends vertically below filter disk 132. Tube prongs 142 extend from lower portion 136 proximate taper 140. Tube prongs 142 can engage with a portion of funnel 104 to secure filter assembly 128 relative funnel 104, such as with locating ring 166. In some examples, tube prongs 142 are disposed below locating ring 166 to prevent filter assembly 128 from being inadvertently removed, such as when returning excess spray fluid to its original container. Each of upper portion 134 and lower portion 136 are disposed on vertical axis A-A shown in FIG. 6A.

Vent tube 130 can be formed as a single component having openings at opposite ends and a pathway therebetween through the body of vent tube 130. Vent tube 130 can be a single structure or can be formed from multiple components assembled together. For example, upper portion 134 can be formed by a first tube and lower portion 136 can be formed by a second separate tube. In the example shown, upper portion 134 has a first diameter and lower portion has a second diameter different than the first diameter. In the example shown, the second diameter is larger than the first diameter. It is understood that one or both of upper portion 134 and lower portion 136 can be frustoconical such that the diameter of upper portion 134 and/or lower portion 136 varies along the length of that portion. For example, upper portion 134 can have a larger diameter adjacent filter disk 132 and a smaller diameter adjacent tube ring 138. In some examples, the smallest diameter of lower portion 136 is larger than the largest diameter of upper portion 134.

Tube ring 138 is disposed at an end of upper portion 134 opposite filter disk 132. Tube ring 138 facilitates the user inserting filter assembly 128 into funnel 104 and removing filter assembly 128 from funnel 104. The pathway through vent tube 130 may not extend through tube ring 138. Instead, the opening through the end of upper portion 134 can open into an area defined by tube ring 138. Axis A-A can pass through tube ring 138.

Filter disk 132 projects radially relative to vent tube 130. Filter disk 132 includes screen 144 configured to filter the spray fluid as the spray fluid is poured through filling device 102. Filter disk 132 extends orthogonal to vent tube 130. Filter disk 132 and vent tube 130 can be disposed coaxially on vertical axis A-A. Filter disk 132 can be formed in any suitable manner Screen 144 can be formed in any suitable manner. In some examples, screen 144 can be molded polymer. In some examples, screen 144 can be formed from metal or polymer mesh fixed to filter disk 132. In some examples, other components of filter disk 132 can be overmolded around screen 144 to fix screen 144.

Fitting ring 146 and guide ring 148 are disposed at the radial edge of filter disk 132. Guide ring 148 is sloped to direct spray fluid towards screen 144. Guide ring 148 is angled and configured to fit against the interior surface of funnel body 106. Fitting ring 146 is configured to interface with surfaces within funnel 104. Disk projections 150 extend radially from fitting ring 146 and are configured to interface with funnel 104 to secure filter assembly 128 within funnel 104.

Figure 7:
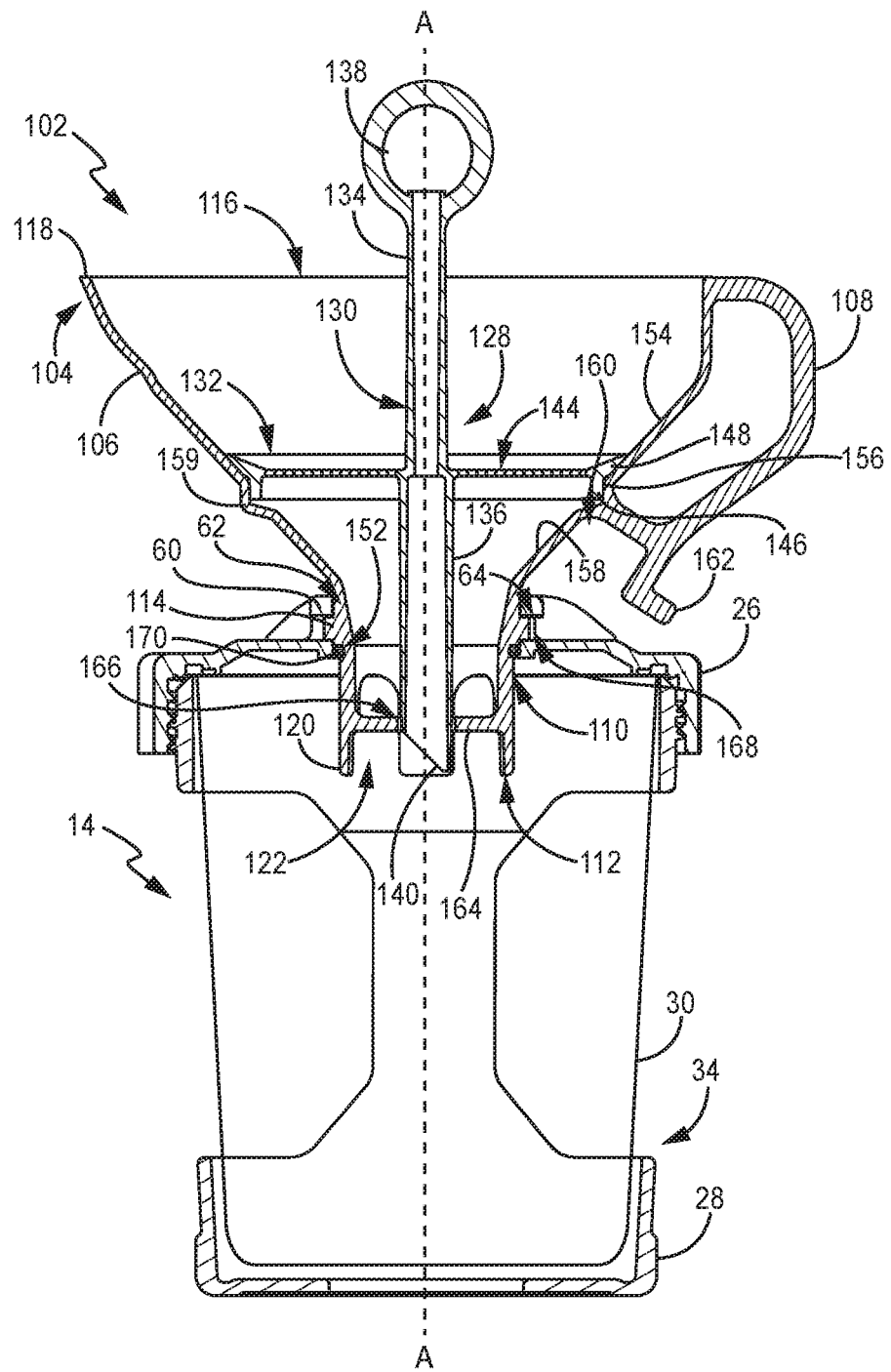
FIG. 7 is a cross-sectional view showing a filling device mounted to a reservoir.

FIG. 7 is a cross-sectional view showing filling device 102 mounted to reservoir 14. Filling device 102 includes funnel 104 and filter assembly 128. Funnel 104 includes funnel body 106, handle 108, neck 110, crown 112, funnel projections 114, upper opening 116, spout 118, locating ring 166, and seal groove 152. Funnel body 106 includes upper sloped portion 154, vertical portion 156, and lower sloped portion 158. Crown 112 includes prongs 120 and voids 122. Handle 108 includes notch 160 and handle extension 162. Filter assembly 128 includes vent tube 130 and filter disk 132. Vent tube 130 includes upper portion 134 and lower portion 136. Taper 140 of lower portion 136 is shown. Filter disk 132 includes screen 144, fitting ring 146, and guide ring 148. Reservoir 14 includes cup 28, liner 30, and lid 26. Cup 28 includes windows 34. Lid 26 includes collar 60, aperture 62, and slots 64.

Lid 26 is fixed to cup 28. Liner 30 is disposed within cup 28 and captured between lid 26 and cup 28. Windows 34 are formed through cup 28 and provide access to liner 30. Collar 60 extends from the top side of lid 26. Aperture 62 is formed through collar 60 and provides an opening to the interior of liner 30. Aperture 62 can form the only opening to the interior of liner 30, and thus to the interior of reservoir 14. Slots 64 are formed in collar 60. In the example shown, at least a portion of each slot 64 projects fully through collar 60.

Filling device 102 is mounted to reservoir 14 to provide refill fluid to reservoir 14. Funnel 104 is directly connected to lid 26 to connect filling device 102 to reservoir 14. Funnel 104 connects to lid 26 at interface 168. A funnel mount interfaces with a reservoir mount at interface 168 to connect filling device 102 to reservoir 14. Interface 168 is substantially similar to interface 36. Each of interface 168 and interface 36 can be formed in the same manner Neck 110 is disposed at an opposite end of funnel body 106 from upper opening 116. Handle 108 extends from an exterior of funnel body 106. Handle 108 is connected to funnel body 106 at two locations in the example shown. A first end of handle 108 is connected to funnel body 106 proximate upper opening 116. A second end of handle 108 is connected to funnel body 106 between upper opening 116 and neck 110. Handle 108 defines an open area through which the hand (e.g., fingers) of a user can extend to grasp handle 108. Handle extension 162 extends from a lower end of handle 108. Notch 160 is defined between handle extension 162 and funnel body 106. Spout 118 is disposed at an opposite side of funnel body 106 from handle 108.

Upper sloped portion 154 extends above filter disk 132. Upper sloped portion 154 can extend from the lip of funnel 104 defining upper opening 116. In the example shown, a vertical wall extends from the lip of funnel 104 and upper sloped portion 154 extends from the vertical wall. Vertical portion 156 is formed between upper sloped portion 154 and lower sloped portion 158. Seat 159 is disposed adjacent vertical wall 156 and between vertical wall 156 and lower sloped portion 158. Lower sloped portion 158 extends from seat 159 to neck 110. While funnel body 106 is shown as including upper sloped portion 154, vertical portion 156, and lower sloped portion 158, it is understood that funnel body 106 can be formed in any desired manner. In some examples, funnel body 106 can include a smoothly contoured interior surface.

Neck 110 extends from lower sloped portion 158 and defines a narrowest diameter of the pathway through funnel 104. Locating ring 166 is formed in an interior of neck 110. Locating ring 166 is supported by ligaments 164 extending from an interior side of neck 110 to locating ring 166. In some examples, an annular array of ligaments 164 extend to support locating ring 166. Crown 112 is formed at a distal end of neck 110. Crown 112 is formed by alternating prongs 120 and voids 122. The ligaments 164 extending to support and/or form locating ring 166 can extend from prongs 120.

Funnel projections 114 extend radially from the exterior of neck 110 and are configured to engage within slots 64 to secure funnel 104 to reservoir 14. Seal groove 152 is formed on an exterior of neck 110. In the example shown, seal groove 152 is located below funnel projections 114. Seal groove 152 is disposed between funnel projections 114 and crown 112. Seal 170 is disposed within seal groove 152. Seal 170 forms a seal between neck 110 and lid 26. The sealed interface 168 between neck 110 and lid 26 is formed such that spray fluid may only be introduced or removed from reservoir 14 via neck 110. Seal 170 can be a rubber o-ring, among other options. While funnel 104 is shown as sealing with lid 26 by seal 170 interfacing with lid 26, it is understood that funnel 104 can seal with lid 26 in any desired manner. In some examples, seal 170 can be supported by lid 26.

Filter assembly 128 is disposed at least partially within funnel 104. Filter assembly 128 is supported by funnel 104. Vent tube 130 is disposed on axis A-A. Filter disk 132 extends radially relative vent tube 130. Filter disk 132 annularly engages the interior surface of funnel 104. Filter disk 132 can support filter assembly 128 within funnel 104. In the example shown, fitting ring 146 rests on seat 159 and is disposed adjacent vertical portion 156. Fitting ring 146 can interface with vertical portion 156, such as by disk projections 150 (best seen in FIG. 6A) interfacing with vertical portion 156. The interfacing of fitting ring 146 with seat 159 fosters proper alignment of filter assembly 128 within funnel 104. It is understood that some examples of filter assembly 128 may not include fitting ring 146 such that guide ring 148 can support filter assembly 128 relative funnel 104.

Guide ring 148 interfaces with the body of funnel 104. In the example shown, guide ring 148 interfaces with upper sloped portion 154. Guide ring 148 is sloped similar to upper sloped portion 154 to facilitate a sealing interface between guide ring 148 and funnel body 106. Guide ring 148 can form an annular seal with the sloped interior surface of funnel 104. The seal can prevent the spray fluid from flowing between filter assembly 128 and funnel 104 and instead force the spray fluid to flow through screen 144. The spray fluid is thereby forced to flow through filter disk 132 and not around filter disk 132. Guide ring 148 also prevents inverse installation of filter assembly 128 as the wider diameter of guide ring 148 prevents guide ring 148 from interfacing with seat 159. Guide ring 148 can be formed from polymer to facilitate sealing with the interior sloped surface of funnel 104, though other materials are possible.

Vent tube 130 extends above and below filter disk 132. Vent tube 130 includes only two openings, through the ends of upper portion 134 and lower portion 136. Vent tube 130 does not include other openings. Vent tube 130 defines a flowpath between the two openings.

Upper portion 134 of vent tube 130 extends from a first side of filter disk 132 and lower portion 136 extends from a second side of filter disk 132. Upper portion 134 has narrower inner and outer diameters than lower portion 136. In the example shown, upper portion 134 extends through upper opening 116 such that upper portion 134 projects beyond an upper edge of funnel 104. Tube ring 138 is disposed at an end of upper portion 134 and can be grasped by a user to facilitate insertion of filter assembly 128 into funnel 104 and removal of filter assembly 128 from funnel 104. Tube ring 138 also prevents inverse installation of filter assembly 128 as the user grasps tube ring 138 when inserting filter assembly 128 into funnel 104. Lower portion 136 extends into and is received by locating ring 166. Lower portion 136 being received by locating ring 166 locates filter assembly 128 on axis A-A.

Lower portion 136 extends through aperture 62 and into an interior of reservoir 14. Lower portion 136 extends below the top edge of the liner 30 where liner 30 is captured between lid 26 and cup 28. Taper 140 is formed at the end of lower portion 136 within reservoir 14. Taper 140 enlarges the opening through lower portion 136 and angles the opening through lower portion 136 such that the opening is at least partially disposed above the distal end of crown 112.

Crown 112 provides standoff space from the bottom end of vent tube 130. Liner 30 can crumple upwards towards lid 26 when liner 30 is evacuated of fluid. Crown 112 provides standoff space to prevent liner 30 from plugging the opening through lower portion 136 of vent tube 130. Plugging the opening through lower portion 136 would not allow airflow through vent tube 130, which would prevent additional fluid from entering into reservoir 14 during the refill process. Crown 112 can also engage liner 30 to push liner 30 downward upon insertion of funnel 104 through lid 26 in cases where liner 30 has contracted too high within reservoir 14. Crown 112 pushes liner 30 downwards upon insertion of funnel 104 and before refilling of reservoir 14 begins.

During refilling, filling device 102 is installed on reservoir 14. In some examples, filter assembly 128 is inserted into funnel 104 prior to connecting funnel 104 to lid 26. In other examples, filter assembly 128 can be inserted into funnel 104 after funnel 104 is connected to lid 26. Neck 110 extends through aperture 62. Funnel projections 114 are disposed in slots 64 and funnel 104 is rotated relative lid 26 to lock filling device 102 to reservoir 14.

The user pours spray fluid into funnel 104. Funnel body 106 guides the spray fluid to filter disk 132 and the interface between guide ring 148 and funnel body 106 causes the spray fluid to flow through screen 144. Screen 144 filters clots out of the spray material as the spray material passes through screen 144. Air flows through vent tube 130 as the spray material flows into reservoir 14. The airflow prevents a vacuum condition from forming in reservoir 14 that would inhibit the spray fluid from flowing into reservoir 14. Air can also be evacuated from reservoir 14 through vent tube 130. Spray fluid does not travel through vent tube 130. Spray fluid travels around vent tube 130 and air travels through vent tube 130. The air flowing to and/or from reservoir 14 does not need to travel through neck 110, except to the extent that vent tube 130 is disposed within neck 110. As such, air does not need to bubble through the spray fluid, which may lead to splattering and other mess. The airflow also increases the speed of the refill as vacuum conditions are avoided. In some examples, the spray fluid passes through funnel 104 entirely outside of vent tube 130. In some examples, the air passes through funnel 104 entirely within vent tube 130.

The fluid level within liner 30 continues to rise until the fluid level reaches the bottom end of lower portion 136 (or slightly higher in examples where lower portion 136 includes taper 140). The rising fluid level seals the opening through the bottom end of vent tube 130, preventing additional airflow. There is thus no pathway for air trapped between the bottom end of vent tube 130 below the interface between neck 110 and lid 26 to go and additional air is prevented from entering into reservoir 14. A vacuum can form and prevent additional spray fluid from easily flowing into reservoir 14. The opening through lower portion 136 being disposed below the location where liner 30 is trapped between lid 26 and cup 28 prevents overfilling of reservoir 14 as the spray fluid reaches and covers the opening through vent tube 130 before reaching that interface.

With the opening through vent tube 130 covered, additional spray fluid poured into funnel 104 can remain in place and/or backup within funnel 104, which is noticeable by the user. The user then knows that reservoir 14 is refilled and can stop pouring spray fluid into funnel 104. The user can pick up filling device 102 and reservoir 14 by grasping handle 108 and can pour excess spray fluid from filling device 102 into the spray fluid storage container, such as a paint can. The user can pour the spray fluid through spout 118. Funnel 104 remaining connected to reservoir 14 while the excess spray fluid is removed prevents mess and allows for reservoir 14 to be fully refilled during the refill process. The user does not have to underfill reservoir 14 to ensure that no spray fluid remains in funnel 104 at the end of the fill process. In some examples, filter assembly 128 can be removed prior to pouring the spray fluid from funnel 104. The user can grasp tube ring 138 and pull filter assembly 128 out of funnel 104.

After excess spray fluid has been removed from funnel 104, funnel 104 can be detached from reservoir 14. Funnel 104 is shifted from the locked state to the unlocked state, such as by rotating funnel 104 relative to reservoir 14. Funnel 104 can then be lifted away from reservoir 14. The refilled reservoir 14 can then be attached to sprayer 10 and spraying can be resumed.

Figure 8A:
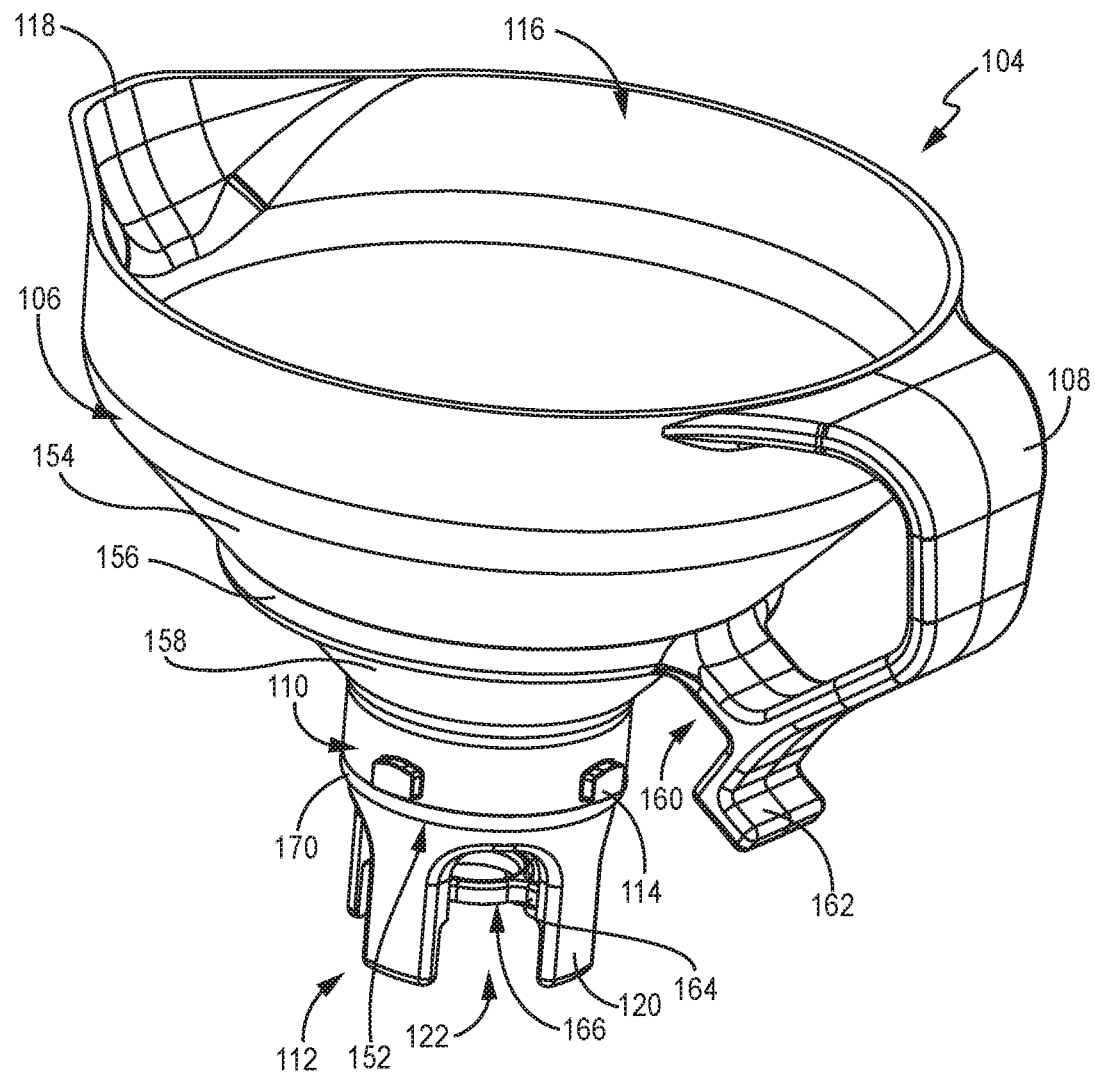
FIG. 8A is an isometric view of a funnel.
Figure 8B:
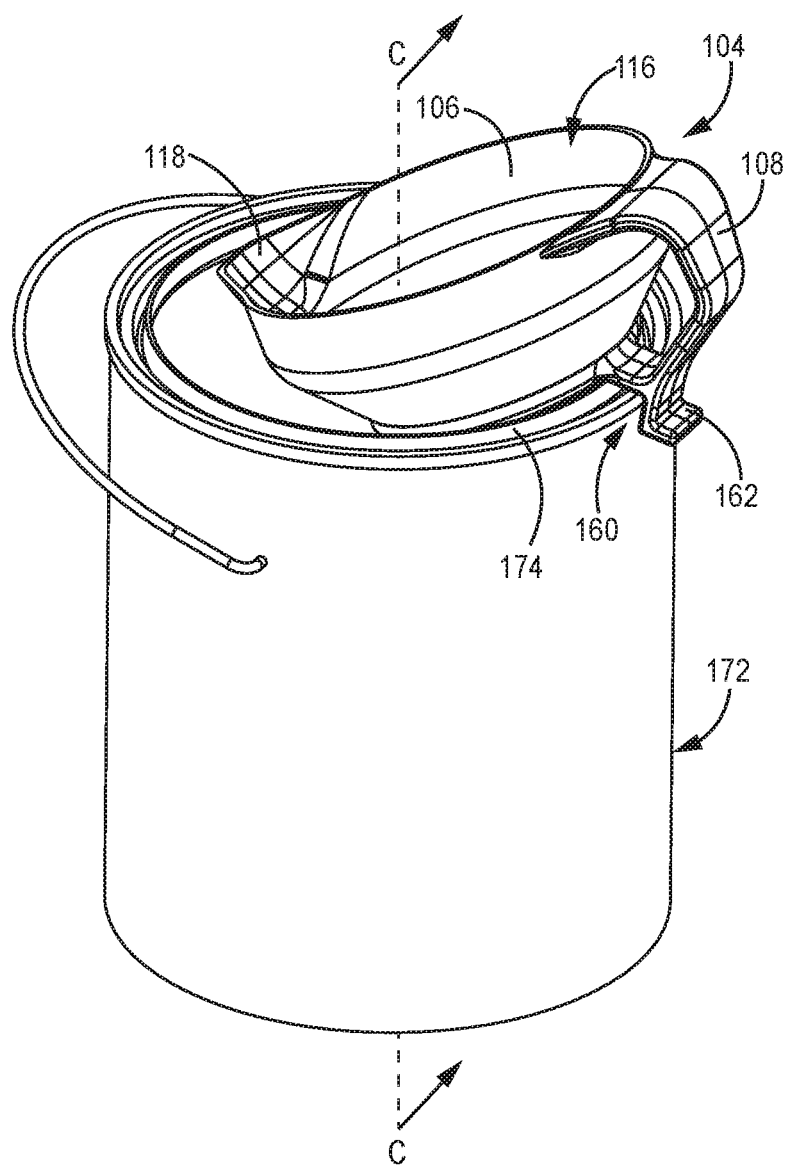
FIG. 8B is an isometric view showing a disposed on a fluid supply container.
Figure 8C:
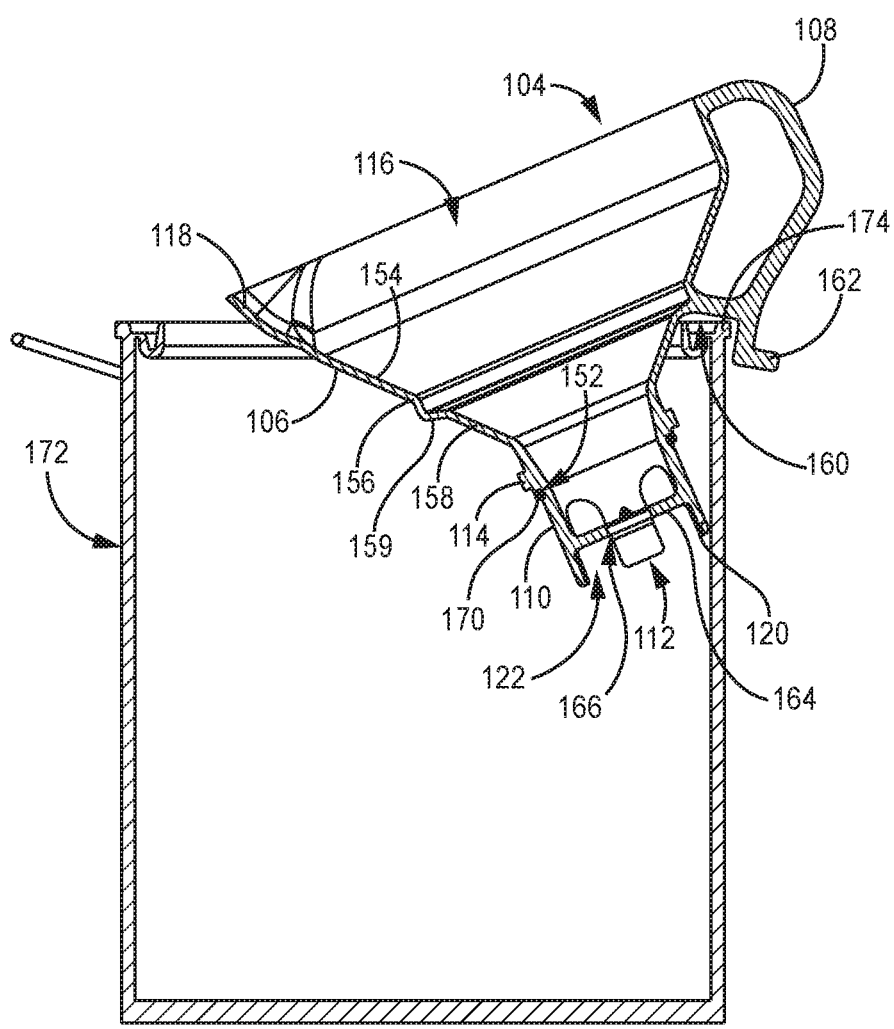
FIG. 8C is a cross-sectional view taken along line C-C in FIG. 8B.

FIG. 8A is an isometric view of funnel 104. FIG. 8B is an isometric view showing funnel 104 disposed on storage container 172. FIG. 8C is a cross-sectional view taken along line C-C in FIG. 8B. FIGS. 8A-8C will be discussed together. Funnel 104 includes funnel body 106, handle 108, neck 110, crown 112, funnel projections 114, upper opening 116, spout 118, ligaments 164, locating ring 166, and seal groove 152. Funnel body 106 includes upper sloped portion 154, vertical portion 156, and lower sloped portion 158. Crown 112 includes prongs 120 and voids 122. Handle 108 includes notch 160 and handle extension 162. Seal 170 is disposed in seal groove 152.

Funnel 104 can be supported by lip 174 of storage container 172 when not in use. Storage container 172 can be a paint can, among other options. Lip 174 can be received by notch 160 formed between handle extension 162 and funnel body 106. Handle extension 162 is disposed outside of the storage container 172 while neck 110 is disposed inside of storage container 172. Handle extension 162 extends below lip 174. One or more of the prongs 120 forming crown 112 can contact the interior surface of storage container 172. Crown 112 contacting the interior surface of storage container 172 prevents undesired contact between the exterior portions of funnel body 106 and the interior surface of storage container 172, which can lead to undesired mess on those portions of funnel body 106. Only portions of funnel 104 that can normally be contacted by spray fluid during the refill contact the interior of storage container 172.

In this state, any spray fluid remaining in funnel 104 can drip through neck 110 and into storage container 172, avoiding dripping of the spray fluid outside of storage container 172, which can cause undesired mess. Storage container 172 can fully support funnel 104 until funnel 104 is required for additional refills. Filter assembly 128 (best seen in FIGS. 6A and 6B) can be inserted into funnel 104 for storage. As such, the storage container 172 can fully support filling device 102 until additional refills are needed.

Figure 9A:
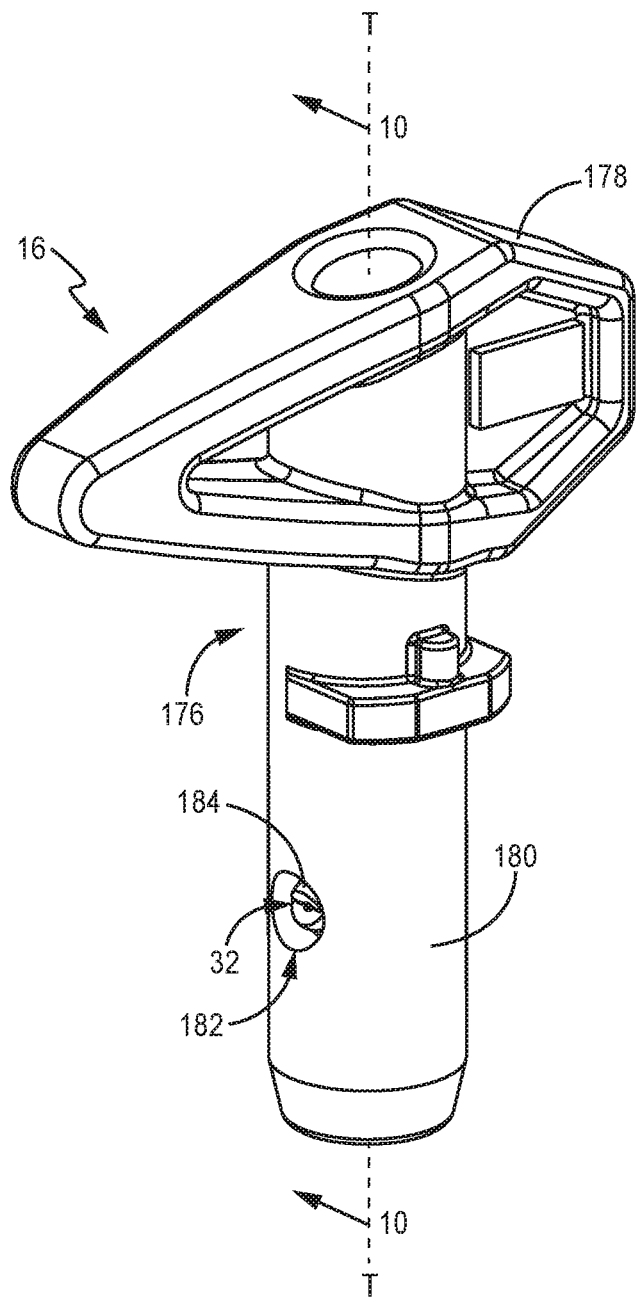
FIG. 9A is an isometric view of a spray tip.
Figure 9B:
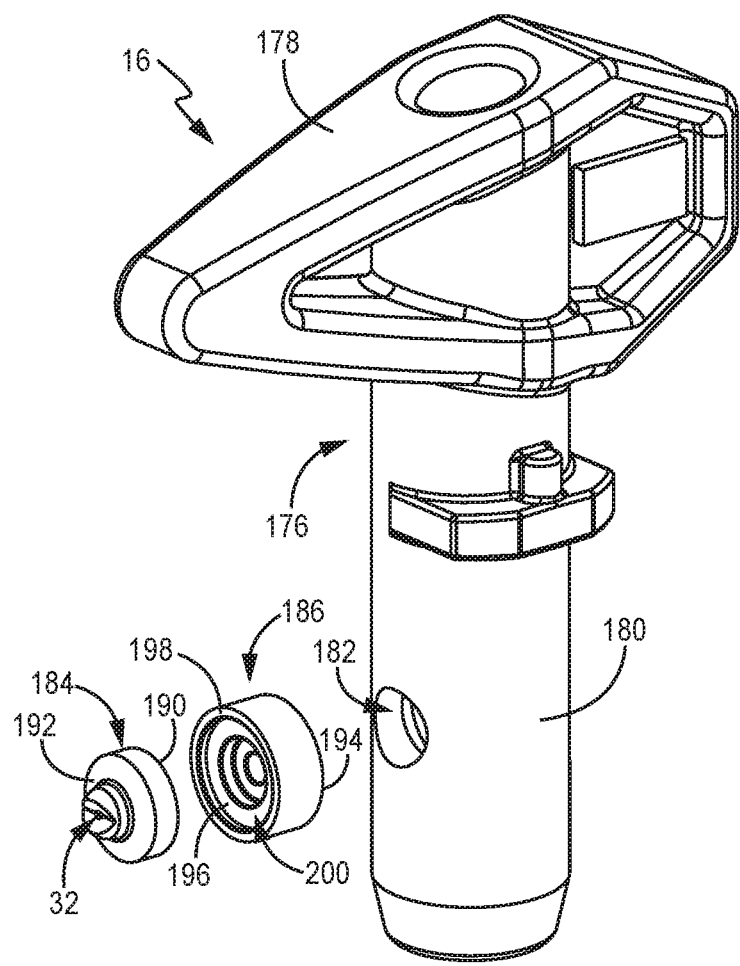
FIG. 9B is an isometric view of a spray tip showing a pre-orifice piece and a tip piece exploded away from the tip body.

FIG. 9A is an isometric view of spray tip 16. FIG. 9B is an isometric exploded view of spray tip 16 showing pre-orifice piece 186 and tip piece 184 exploded away from tip body 176. Spray tip 16 includes tip body 176 having handle 178 and barrel 180. Barrel 180 includes tip channel 182. Tip piece 184 includes nozzle 32, upstream end 190, and downstream end 192. Pre-orifice piece 186 includes upstream end 194, downstream end 196, ring 198, and receiving area 200.

Spray tip 16 is removable and replaceable within sprayer 10 (best seen in FIGS. 1-2B). Barrel 180 extends from handle 178. Handle 178 can be grasped by a user to manipulate spray tip 16. Handle 178 and barrel 180 can be formed as a unitary part or formed separately and assembled together. In some examples, handle 178 and barrel 180 can be formed by molding. Barrel 180 can be formed from a polymer or a metal. Barrel 180 can be cylindrical.

Tip channel 182 extends fully through barrel 180 such that tip channel 182 has two open ends. Tip channel 182 extends transversely through vertical axis T-T of spray tip 16. Tip channel 182 can extend along an axis orthogonal to vertical axis T-T. Tip piece 184 and pre-orifice piece 186 are disposed with in tip channel 182. In some examples, barrel 180 is overmolded around tip piece 184 and pre-orifice piece 186 to form spray tip 16. Tip piece 184 and pre-orifice piece 186 can be formed from metal. In some examples, one or both of tip piece 184 and pre-orifice piece 186 are formed from tungsten carbide.

Nozzle 32 is formed in tip piece 184. Downstream end 192 is oriented out of tip channel 182 and nozzle 32 is formed at downstream end 192. Upstream end 190 is oriented towards pre-orifice piece 186. In some examples, upstream end 190 abuts and directly contacts downstream end 196 of pre-orifice piece 186.

Pre-orifice piece 186 is disposed upstream of tip piece 184. Ring 198 extends from downstream end 196. Receiving area 200 is disposed adjacent downstream end 196 and radially defined by ring 198. Upstream end 190 of tip piece 184 is disposed in receiving area 200 of pre-orifice piece 186. Ring 198 locates tip piece 184 relative pre-orifice piece 186.

Figure 10A:
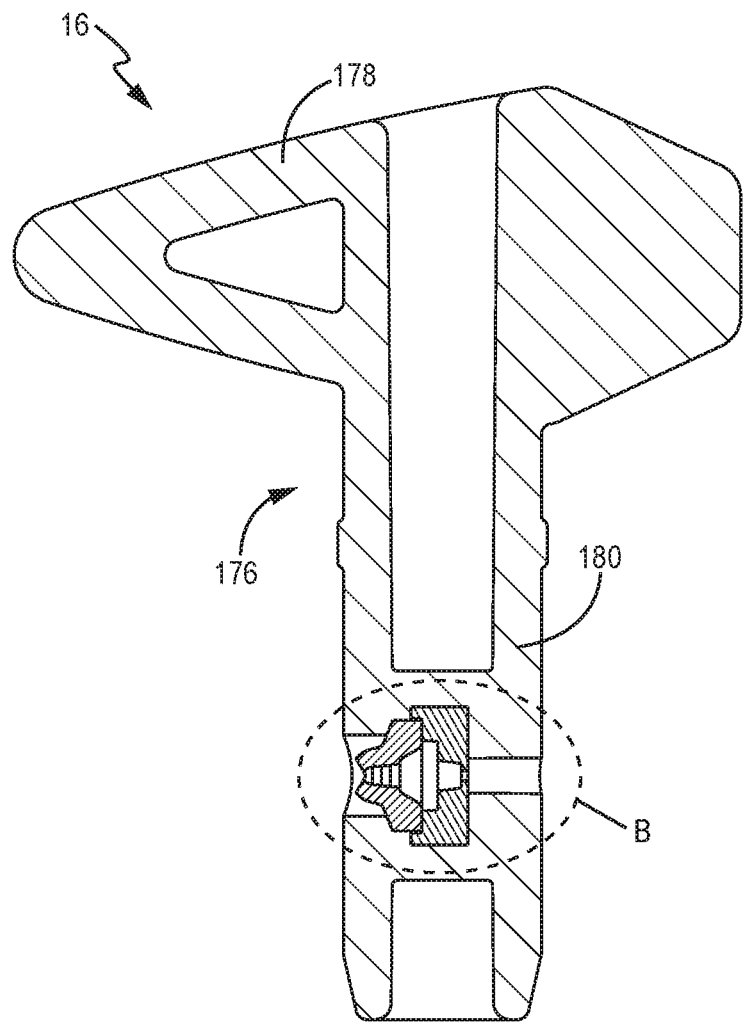
FIG. 10A is a cross-sectional view taken along line 10-10 in FIG. 9A.
Figure 10B:
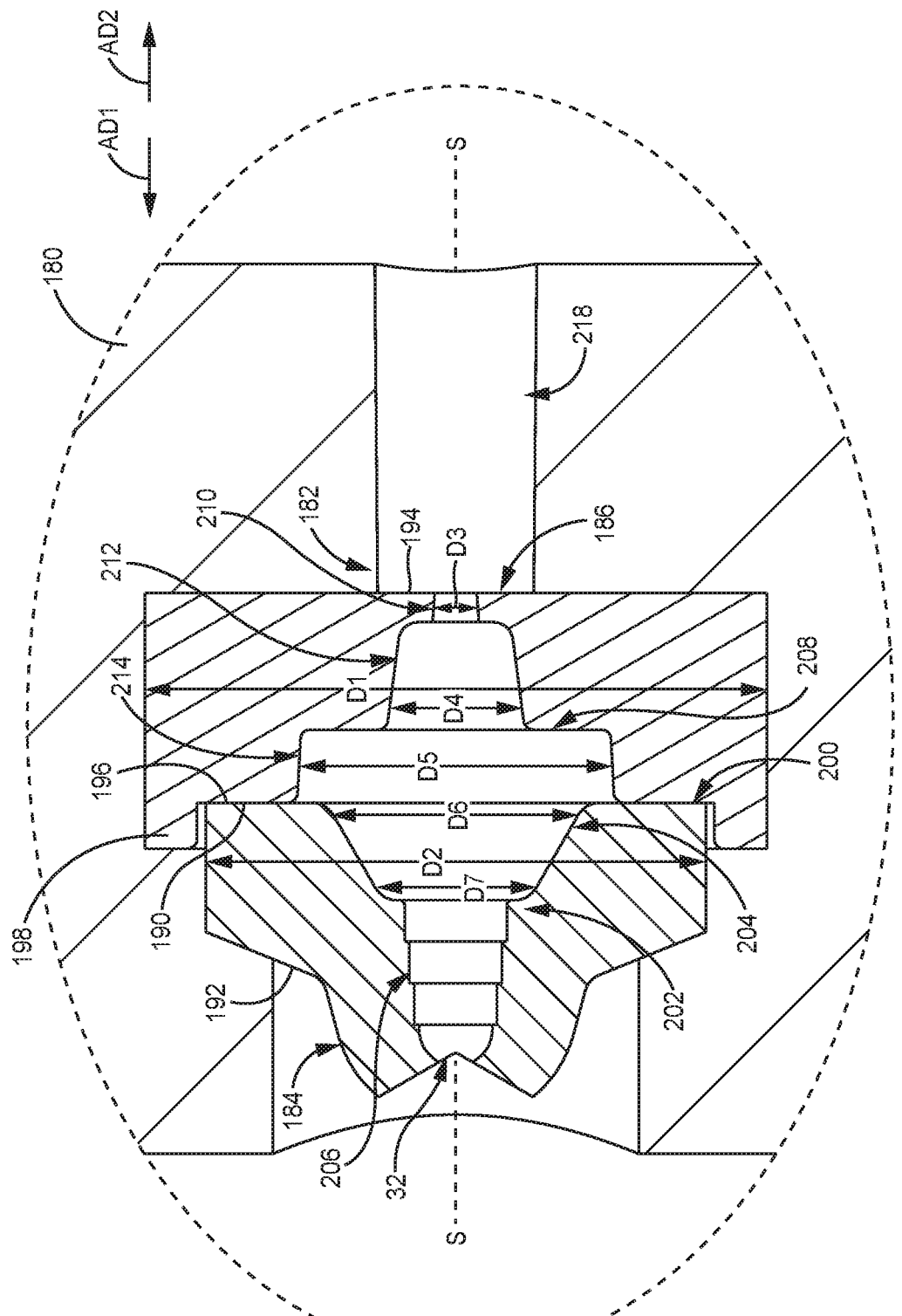
FIG. 10B is an enlarged view of detail B in FIG. 10A.

FIG. 10A is a cross-sectional view taken along line 10-10 in FIG. 9A. FIG. 10B is an enlarged view of detail B in FIG. 10A. FIGS. 10A and 10B will be discussed together. Spray tip 16 includes tip body 176 having handle 178 and barrel 180. Barrel 180 includes tip channel 182. Tip piece 184 includes nozzle 32, upstream end 190, downstream end 192, and tip passage 202. Tip passage 202 includes tip chamber 204 and stepped passage 206. Pre-orifice piece 186 includes upstream end 194, downstream end 196, ring 198, receiving area 200, and pre-orifice passage 208. Pre-orifice passage 208 includes pre-orifice 210, first chamber 212, and second chamber 214. First chamber 212, second chamber 214, and tip chamber 204 define turbulation chamber 216.

Tip piece 184 and pre-orifice piece 186 are embedded within barrel 180. Barrel 180 and handle 178 can be injection molded about tip piece 184 and pre-orifice piece 186. As such, barrel 180 can be considered as being overmolded about tip piece 184 and pre-orifice piece 186. Tip piece 184 and pre-orifice piece 186 are disposed in tip channel 182. Tip piece 184 abuts pre-orifice piece 186. Fluid can flow through tip channel 182 in either one of first axial direction AD1 and second axial direction AD2. Fluid flows through tip channel 182 in first axial direction AD1, first through pre-orifice piece 186 and then through tip piece 184, with spray tip 16 in the spray position and in second axial direction AD2, first through tip piece 184 and then through pre-orifice piece 186, with spray tip 16 in the de-clog position. The discussion of spray tip 16 is generally focused on flow with spray tip 16 in the spray position as shown.

Ring 198 extends in first axial direction AD1 from downstream end 196. Ring 198 extends away from downstream end 196. Ring 198 is an annular ring that defines receiving area 200. Pre-orifice piece 186 has outer diameter D1 and tip piece 184 has outer diameter D2. Outer diameter D1 is larger than outer diameter D2, such that pre-orifice piece 186 has a larger diameter than tip piece 184. Upstream end 190 of tip piece 184 is disposed within receiving area 200. Ring 198 radially surrounds a portion of tip piece 184. Ring 198 locates upstream end 190 within receiving area 200 and maintains alignment between tip piece 184 and pre-orifice piece 186 on spray axis S-S. Pre-orifice 210 thereby includes a downstream lip that radially surrounds upstream end 190 of tip piece 184.

Pre-orifice passage 208 extends through pre-orifice piece 186 between upstream end 194 and downstream end 196. Pre-orifice 210 extends into upstream end 194 of pre-orifice piece 186. Orifice 210 forms a narrowest portion of pre-orifice passage 208. Orifice 210 has a diameter D3. First chamber 212 extends between orifice 210 and second chamber 214. First chamber 212 can be cylindrical or tapered. First chamber 212 has diameter D4. Diameter D4 can be taken at any desired location along the length of first chamber 212. Second chamber 214 extends from first chamber 212 to downstream end 196 of pre-orifice piece 186. Second chamber 214 can be cylindrical or tapered. Second chamber 214 has diameter D5. Diameter D5 can be taken at any desired location along the length of second chamber 214. D5 is larger than diameter D4 regardless of the axial position along second chamber 214 that diameter D5 is taken and regardless of the axial position along first chamber 212 that diameter D4 is taken. Diameter D4 is larger than diameter D3 regardless of the axial position along first chamber 212 that diameter D4 is taken.

Tip passage 202 extends through tip piece 184 between upstream end 190 and downstream end 192. Tip passage 202 is in fluid communication with pre-orifice passage 208. Tip chamber 204 extends into tip piece 184 from upstream end 190. Tip chamber 204 is a tapered chamber extending from diameter D6 at upstream end 190 to diameter D7 within tip piece 184. Diameter D6 is larger than diameter D7. Stepped passage 206 extends from tip chamber 204 to nozzle 32. Stepped passage 206 is formed by multiple passages each having a reduced diameter as compared to an immediately upstream passage. Each of diameters D6 and D7 are larger than the diameter of any one of the passages forming stepped passage 206. Diameter D5 is larger than diameter D6 regardless of the axial position along second chamber 214 that diameter D5 is taken. Diameter D6 is larger than diameter D4 regardless of the axial position along first chamber 212 that diameter D4 is taken.

Turbulation chamber 216 extends between orifice 210 and stepped passage 206. First chamber 212, second chamber 214, and tip chamber 204 define turbulation chamber 216. Orifice 210 opens into turbulation chamber 216 to provide fluid to turbulation chamber 216. Stepped passage 206 similarly opens into turbulation chamber 216 to receive fluid from turbulation chamber 216. An inner radial portion of upstream end 190 is exposed within turbulation chamber 216.

During spraying, spray fluid flows through upstream passage 218 within tip channel 182 through barrel 180. The spray fluid encounters upstream end 194 and flows through orifice 210 into turbulation chamber 216. The spray fluid flows into turbulation chamber 216 at high pressure. The orifice 210 allows only a jet of spray fluid to enter turbulation chamber 216. The widened turbulation chamber 216 relative orifice 210 induces turbulence in the spray fluid entering turbulation chamber 216. The induced turbulence shears the spray fluid, temporarily lowering the viscosity and allowing the spray fluid to be atomized at lower pressure. The shearing is enhanced by the enlarged width of the upstream portion of turbulation chamber 216, which wider section is made possible by tip piece 184 extending into receiving area 200 of pre-orifice piece 186 (as opposed to the pre-orifice piece 186 extending into tip piece 184 which would reduce the diameter of the upstream portion of turbulation chamber 216 or required an increased length of pre-orifice piece 186 to generate the desired shearing, causing fluid losses). Pre-orifice piece 186 receiving a portion of tip piece 184 thereby allows pump 42 to lower pressures while still generating sufficient pressure to atomize the spray fluid.

The mating interface between pre-orifice piece 186 and tip piece 184, where a portion of pre-orifice piece 186 radially surrounds and axially overlaps with tip piece 184, provides significant advantages. The mating interface prevents spray fluid from leaking between pre-orifice piece 186 and tip piece 184. The spray fluid is thereby forced to flow only through pre-orifice piece 186 and tip piece 184, from orifice 210 through turbulation chamber 216 and out through stepped passage 206. The mating interface further prevents the material forming barrel 180 from squeezing between pre-orifice piece 186 and tip piece 184 in examples where barrel 180 is overmolded around pre-orifice piece 186 and tip piece 184. The mating interface further maintains relative alignment between pre-orifice piece 186 and tip piece 184 during assembly as barrel 180 is overmolded around pre-orifice piece 186 and tip piece 184. The mating interface further facilitates the large diameter of turbulation chamber 216 while maintaining a relatively compact axial arrangement of pre-orifice piece 186 and tip piece 184. Ring 198 extending around tip piece 184 facilitates the relatively large diameter of second chamber 214 within pre-orifice piece 186, which is advantageous for generating turbulence and for shearing of the spray fluid. The shorter axial length of turbulation chamber 216 facilitated by the mating interface reduces pressure loss, enhancing atomization as the spray fluid exits through nozzle 32.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A spray system comprising:
- a sprayer having a body and a pump configured to pump spray fluid to a spray tip;
- a reservoir mountable to the sprayer by a first interface formed between a reservoir mount of the reservoir and a sprayer mount of the sprayer, wherein the reservoir mount extends around an opening that is open to an interior of the reservoir, wherein the reservoir mount is configured to connect to the sprayer mount such that the sprayer supports the reservoir by the sprayer mount connecting to the reservoir mount; and
- a filling device mountable to the reservoir by a second interface formed between the reservoir mount and a fill mount, wherein the filling device includes a funnel having the fill mount and configured to route fluid to the reservoir through the opening, wherein the fill mount and the reservoir mount are configured to connect together such that the reservoir is connected to the filling device to move with the filling device.

2. The spray system of claim 1, wherein the reservoir includes a cup and a lid removably connected to the cup, and wherein the reservoir mount includes a collar extending from the lid and at least one slot formed in the collar.

3. The spray system of claim 1, wherein:
- the sprayer mount includes a first neck and at least one first projection extending from the first neck; and
- the fill mount includes a second neck and at least one second projection extending from the second neck.

4. The spray system of claim 1, wherein the filling device comprises:
- the funnel configured to lock to and unlock from the reservoir, the funnel comprising:
  - a funnel body extending between a top opening and a neck; and
  - a connector formed on the neck and configured to secure the funnel to the reservoir; and
- a filter assembly mountable within the funnel, the filter assembly comprising:
  - a filter disk configured to engage an inner wall of the funnel body such that fluid through the funnel is routed through the filter disk.

5. The spray system of claim 4, wherein the funnel further comprises a handle extending from the funnel body.

6. The spray system of claim 5, wherein the handle includes a handle projection extending from a main body of the handle.

7. The spray system of claim 6, wherein a notch is formed between the handle projection and the funnel body.

8. The spray system of claim 4, wherein the connector includes at least one projection extending radially from the neck.

9. The spray system of claim 8, wherein a seal groove is formed on an exterior of the neck between the at least one projection and an end of the neck opposite the funnel body.

10. The spray system of claim 4, wherein the inner wall of the funnel body includes an upper sloped portion extending from the top opening, a vertical portion disposed at an end of the upper sloped portion opposite the top opening, and a lower sloped portion between the vertical portion and the neck.

11. The spray system of claim 10, wherein a seat is formed between the vertical portion and the lower sloped portion, and wherein the filter disk is configured to engage the seat.

12. The spray system of claim 4, wherein the filter disk includes a screen and a guide ring dispose about an outer edge of the screen, the guide ring configured to engage the inner wall.

13. A spray system comprising:
- a handheld sprayer having a body and a pump configured to pump spray fluid to a spray tip;
- a reservoir mountable to the handheld sprayer by a first interface formed between a reservoir mount and a sprayer mount; and
- a filling device mountable to the reservoir by a second interface formed between the reservoir mount and a fill mount, wherein the filling device includes:
  - a funnel having the fill mount and configured to route fluid to the reservoir, the funnel configured to lock to and unlock from the reservoir, the funnel comprising:

a funnel body extending between a top opening and a neck; and a connector formed on the neck and configured to secure the funnel to the reservoir; and a filter assembly mountable within the funnel, the filter assembly comprising:

a filter disk configured to engage an inner wall of the funnel body such that fluid through the funnel is routed through the filter disk; and a vent tube extending from the filter disk, the vent tube comprising:

an upper portion extending in a first direction from the filter disk; and a lower portion extending in a second direction from the filter disk.

14. The spray system of claim 13, wherein a vent path extends through the vent tube between a first opening through a first end of the upper portion and a second opening through a second end of the lower portion, wherein the first end of the upper portion is disposed at an opposite end of the upper portion from the filter disk and the second end of the lower portion is disposed at an opposite end of the lower portion from the filter disk.

15. The spray system of claim 14, wherein the first opening and the second opening are the only openings through the vent tube.

16. The spray system of claim 14, wherein a tube ring is formed at the first end of the upper portion, and wherein the first opening opens into an area defined by the tube ring.

17. The spray system of claim 13, wherein the lower portion extends into a locating ring disposed within the neck, the locating ring have a diameter smaller than a diameter of the neck.

18. A method of filling a reservoir for a handheld fluid sprayer, the method comprising:

connecting a filling device to a reservoir by a first interface between a fill mount formed on a funnel of the filling device and a reservoir mount formed on the reservoir such that the reservoir is directly connected to the filling device;

pouring spray fluid into the funnel, the funnel directing the spray fluid to the reservoir through the first interface;

draining excess spray fluid from the funnel by pouring spray fluid out of the funnel while the reservoir remains connected to the filling device by connection between the fill mount and the reservoir mount;

disconnecting the filling device from the reservoir by breaking the first interface; and connecting the reservoir to the handheld fluid sprayer by interfacing the reservoir mount and a sprayer mount of the handheld fluid sprayer, the reservoir mount connected to the sprayer mount such that the reservoir is supported by the handheld fluid sprayer to be carried with the handheld fluid sprayer.

19. The method of claim 18, further comprising:

filtering the spray fluid with a filter assembly disposed within the funnel, the spray fluid flowing through a filter disk of the filter assembly before entering the reservoir.

\* \* \* \* \*